United States Patent
Ambur et al.

(10) Patent No.: US 11,693,168 B2
(45) Date of Patent: *Jul. 4, 2023

(54) OPTICAL ASSEMBLY

(71) Applicant: 3M INNOVATIVE PROPERTIES COMPANY, St. Paul, MN (US)

(72) Inventors: Gregg A. Ambur, River Falls, WI (US); Benjamin G. Sonnek, Mahtomedi, MN (US); Jo A. Etter, Kirkland, WA (US); Timothy L. Wong, St. Paul, MN (US); Thomas P. Klun, Lakeland, MN (US); Richard J. Pokorny, Maplewood, MN (US); Benjamin R. Coonce, South St. Paul, MN (US); Douglas S. Dunn, Woodbury, MN (US); Henry A. Kostalik, IV, Minneapolis, MN (US); Christopher S. Degraw, Eagan, MN (US); John R. Jacobson, Newport, MN (US); Chunjie Zhang, Shoreview, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 608 days.

This patent is subject to a terminal disclaimer.

(21) Appl. No.: 16/755,843

(22) PCT Filed: Oct. 3, 2018

(86) PCT No.: PCT/US2018/054162
§ 371 (c)(1),
(2) Date: Apr. 13, 2020

(87) PCT Pub. No.: WO2019/079033
PCT Pub. Date: Apr. 25, 2019

(65) Prior Publication Data
US 2021/0208320 A1 Jul. 8, 2021

Related U.S. Application Data

(60) Provisional application No. 62/574,921, filed on Oct. 20, 2017.

(51) Int. Cl.
*G02B 5/30* (2006.01)
*B29D 11/00* (2006.01)
(Continued)

(52) U.S. Cl.
CPC .......... *G02B 5/305* (2013.01); *B29D 11/0073* (2013.01); *B29D 11/00548* (2013.01);
(Continued)

(58) Field of Classification Search
None
See application file for complete search history.

(56) References Cited

U.S. PATENT DOCUMENTS 5,882,774 A 3/1999 Jonza
6,609,795 B2 8/2003 Weber
(Continued)

FOREIGN PATENT DOCUMENTS

CN 205246924 U * 5/2016 ....... B29D 11/00644
EP 1193044 4/2002
(Continued)

OTHER PUBLICATIONS

International Search Report for PCT International Application No. PCT/US2018/054162, dated Mar. 22, 2019, 10pgs.

*Primary Examiner* — Derek S. Chapel
(74) *Attorney, Agent, or Firm* — Clifton F. Richardson

(57) ABSTRACT

An optical assembly including an optical element insert molded directly onto an optical stack is provided. The optical stack includes an optical film and may include a liner with the optical film being disposed between the optical element and the liner. The liner, if included, is removable
(Continued)

from the optical film without substantial damage to the optical film. An outermost layer of the optical film may be diffusion bonded to a major surface of the optical element.

21 Claims, 16 Drawing Sheets

(51) Int. Cl.
  *G02B 5/28* (2006.01)
  *G02B 1/14* (2015.01)
  *G02B 1/04* (2006.01)

(52) U.S. Cl.
  CPC ........ *B29D 11/00865* (2013.01); *G02B 1/041* (2013.01); *G02B 1/14* (2015.01); *G02B 5/285* (2013.01)

(56) References Cited

U.S. PATENT DOCUMENTS

| | | | |
|---|---|---|---|
| 6,613,433 B2 * | 9/2003 | Yamamoto | G02B 5/3033 359/488.01 |
| 6,788,463 B2 | 9/2004 | Merrill | |
| 6,991,695 B2 | 1/2006 | Tait | |
| 9,555,589 B1 | 1/2017 | Ambur | |
| 9,557,568 B1 | 1/2017 | Ouderkirk | |
| 2002/0031676 A1 | 3/2002 | Jonza et al. | |
| 2002/0111390 A1 | 8/2002 | Lin | |
| 2004/0027339 A1 | 2/2004 | Schulz | |
| 2012/0227809 A1 | 9/2012 | Bharti et al. | |
| 2015/0146166 A1 * | 5/2015 | Weber | G02B 5/283 359/359 |
| 2017/0017077 A1 | 1/2017 | Tang et al. | |
| 2017/0299898 A1 * | 10/2017 | Gallina | B32B 27/36 |
| 2018/0052328 A1 * | 2/2018 | Holland | B29D 11/00865 |
| 2021/0364682 A1 * | 11/2021 | Ambur | G02B 1/14 |

FOREIGN PATENT DOCUMENTS

| | | |
|---|---|---|
| JP | H06-258604 | 9/1994 |
| JP | 2015-113414 | 6/2015 |
| JP | 2015-205410 | 11/2015 |
| WO | WO 1996-19347 | 6/1996 |
| WO | WO 2010-069961 | 6/2010 |
| WO | 2015080908 A1 | 6/2015 |
| WO | WO 2018-147935 | 8/2018 |
| WO | WO 2018-163009 | 9/2018 |

* cited by examiner

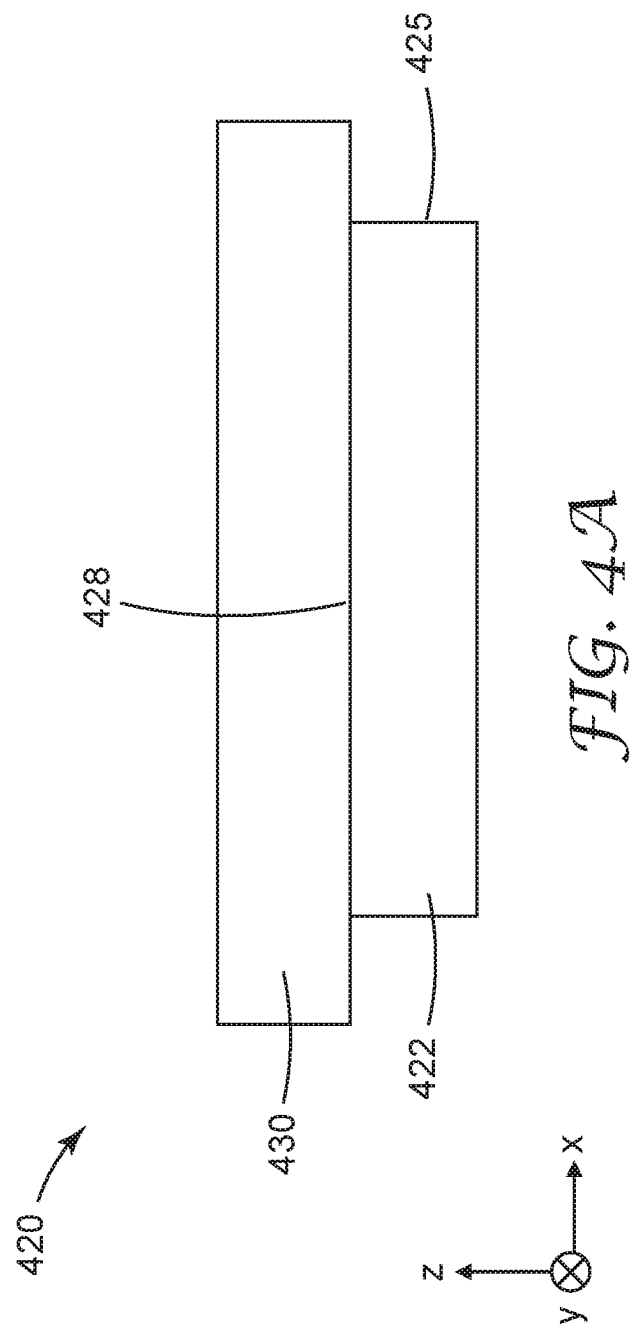

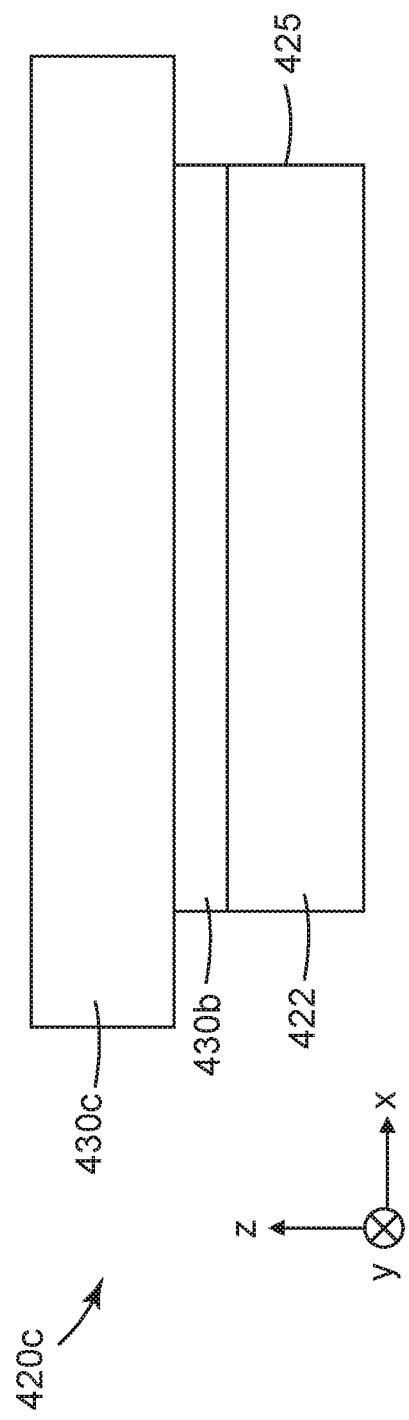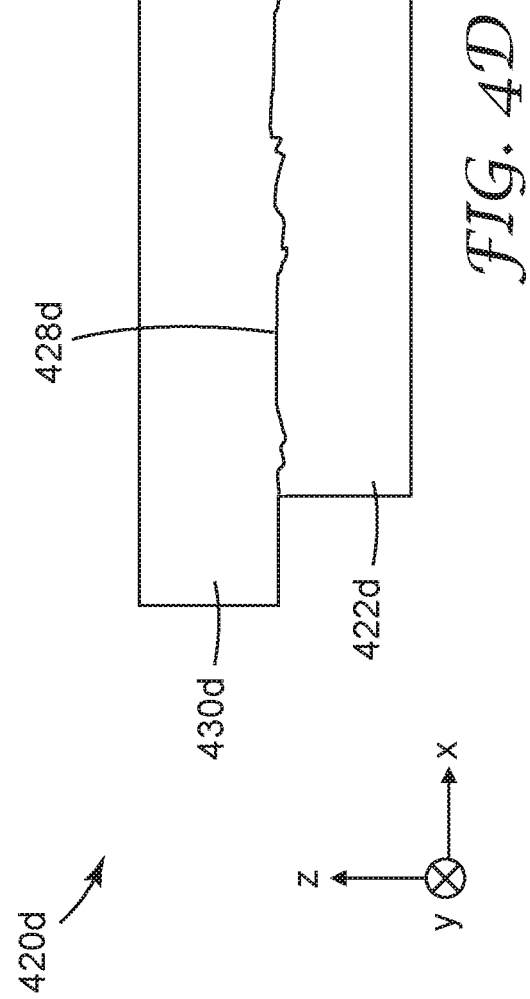

OPTICAL ASSEMBLY

BACKGROUND

In various applications, an optical film may be disposed on an optical element.

SUMMARY

In some aspects of the present description, an optical assembly including an optical element insert molded directly onto an optical stack is provided. The optical stack includes an optical film and a liner, the optical film being disposed between the optical element and the liner. The liner is removable from the optical film without substantial damage to the optical film.

In some aspects of the present description, an optical assembly including an integrally formed multilayer optical film and a first optical element injection insert molded directly onto the optical film is provided. The optical film includes a plurality of alternating polymeric layers reflecting or transmitting light primarily by optical interference. Each location over at least 80% of a total area of the optical film has a reflectance greater than about 80% for normally incident light having a same predetermined wavelength and a same first polarization state. A melting temperature of the first optical element is substantially larger than a glass transition temperature of the optical film.

In some aspects of the present description, an optical assembly including an integrally formed multilayer optical film and an optical element insert molded directly onto the optical film is provided. The optical film includes a plurality of alternating polymeric layers reflecting or transmitting light primarily by optical interference. The optical film is diffusion bonded to the optical element. The bonding of the optical film to the optical element is stronger than an interlayer bonding between at least one pair of immediately adjacent layers in the optical film.

In some aspects of the present description, an optical assembly including an integrally formed multilayer optical film and an optical element insert molded directly onto the optical film is provided. The optical film is diffusion bonded to the optical element. The optical film includes a plurality of alternating polymeric layers reflecting or transmitting light primarily by optical interference. Each location over at least 90% of a total area of the optical film having a reflectance greater than about 90% for normally incident light having a same predetermined wavelength and a same first polarization state.

In some aspects of the present description, an optical assembly including an optical film and a lens insert molded directly onto the optical film is provided. The optical film includes a plurality of alternating polymeric layers reflecting or transmitting light primarily by optical interference. Each location over at least 90% of a total area of the optical film has a reflectance greater than 90% for normally incident light having a same predetermined wavelength and a same first polarization state. The lens has an optical retardance varying more along a largest lateral dimension in a first direction and varying less along a largest lateral dimension in an orthogonal second direction. The optical retardance at each location on the lens being no more than about 10 nm.

In some aspects of the present description, an optical assembly including a lens and a multilayer optical film having opposing first and second major surfaces where the first major surface is disposed on a first portion of a first side of the lens is provided. Each location over at least 80% of a total area of the multilayer optical film has a reflectance greater than about 80% for normally incident light having a same predetermined wavelength and a same first polarization state. A second portion of the first side of the lens is substantially flush with the second major surface of the multilayer optical film.

In some aspects of the present description, an optical assembly including a lens and an optical stack disposed on a major surface of the lens is provided. The lens at least partially wraps around an edge of the optical stack.

In some aspects of the present description, an optical assembly includes a lens having a first major surface defining a curved recess therein and a multilayer optical film adhered and conforming to the curved recess.

In some aspects of the present description, an optical assembly including an optical film and a lens injection molded directly onto the optical film is provided. Each location over at least 80% of a total area of the optical film has a reflectance greater than about 80% for normally incident light having a same predetermined wavelength and a same first polarization state. The lens has an optical retardance of no more than about 10 nm at each location over at least 80% of a major surface of the lens. A lens thickness at a first lens location being at least about 20% greater than a lens thickness at a second lens location.

BRIEF DESCRIPTION OF THE DRAWINGS

FIG. 4A is a schematic cross-sectional view of an optical stack;

FIGS. 4C-4D are schematic cross-sectional views of optical stacks;

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

There are a wide variety of applications where it is desired to dispose an optical film on an optical element. For example, a display may utilize a polarizing beam splitter (PBS) where an optical film is disposed on a hypotenuse of a prism. The optical film may be a multilayer polymeric optical film reflecting or transmitting light primarily by optical interference. As another example, a display system may utilize a folded optics system including a partial reflector and a reflective polarizer disposed adjacent to and spaced apart from one another as described in U.S. Pat. No. 9,557,568 (Ouderkirk et al.), for example. In some cases, it is desired to dispose the reflective polarizer on a major surface of a lens.

Optical assemblies of the present description typically include an optical film, such as an integrally formed multilayer optical film, disposed on an optical element, such as an optical lens. For example, the optical film may be disposed on either major surface of a biconvex lens, a plano-convex lens, a positive meniscus lens, a negative meniscus lens, a plano-concave lens, or a biconcave lens. In some embodiments, the optical element is injection molded onto the optical film so that a diffusion bond forms between the optical film and optical element. In some embodiments, the diffusion bond is stronger than an interlayer bond between adjacent layers in the optical film. In some embodiments, the optical element resulting from the insert molding process has an optical birefringence of less than 10 nm and in some embodiments, the optical birefringence varies more along one direction than along an orthogonal direction.

Figure 1A:
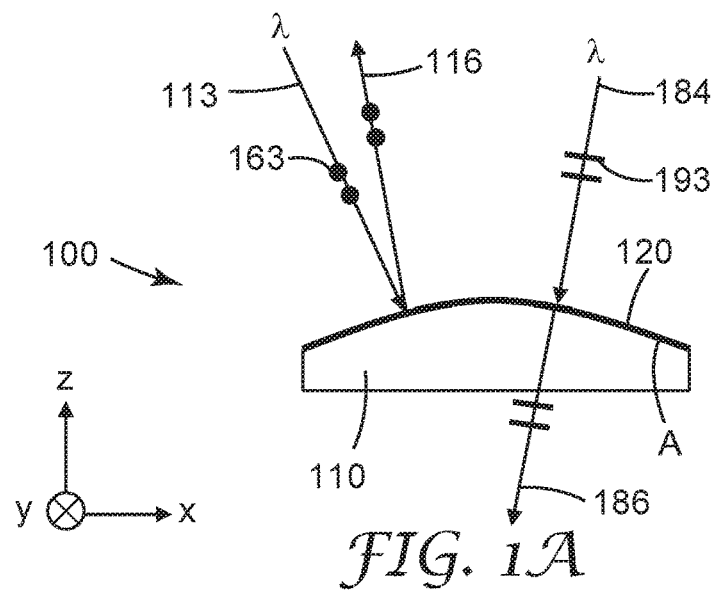
FIGS. 1A-1B are schematic cross-sectional views of optical assemblies.

FIG. 1A is a schematic cross-sectional view of an optical assembly 100 including an optical element 110 and an optical stack 120. In some embodiments, the optical element 110 is insert molded directly onto the optical stack 120. An optical element can be insert molded onto an optical stack by inserting the optical stack into a mold and them molding the optical element onto the optical stack. The insert molding can be injection insert molding, compression insert molding or some other form of insert molding. It is typically preferable that the material that forms the optical element 110 is molten when it contacts optical stack 120 so that the material forms a suitable bond with the optical stack 120 without including any additional adhesive layers. In some embodiments, the material that forms the optical element 110 and the material that forms an outermost surface of the optical stack 120 are selected to be compatible with each other so that a suitable diffusion bond forms between the optical stack 120 and the optical element 110. For example, in some embodiments, similar polymers, or otherwise compatible (e.g., partially miscible) are used for the material that forms the optical element 110 and the material that forms the outermost surface of the optical stack 120 facing the optical element 110. The similar or compatible polymers may have approximately equal melting points (e.g., within 50° C., or within 30° C., or within 20° C., or within 10° C.), for example. In some embodiments, optical stack 120 includes an optical film including a plurality of alternating polymeric layers and the bonding of the optical film to the optical element 110 is stronger than an interlayer bonding between at least one pair of immediately adjacent layers in the optical film.

In some embodiments, the optical element 110 is a lens. In some embodiments, the lens has refractive optical power in a least one direction. For example, optical element 110 may be a cylindrical lens having optical power in one direction (e.g., x-direction) or a spherical or aspherical lens having optical power in two directions (e.g., x- and y-directions). In some embodiments, other types of optical elements may be used. For example, the optical element may be a prism and the optical stack 120 may be disposed on a face (e.g., a curved or substantially planar hypotenuse) of the prism.

In some embodiments, the optical stack 120 is disposed on a curved major surface of the optical element 110 and in some embodiments, the optical stack 120 is disposed on a substantially planar major surface of optical element 110. The optical stack 120 may be disposed on a curved major surface of the optical element 110 so that at least one location on the first curved major surface of the optical element 110 has a radius of curvature in a range from about 6 mm to about 1000 mm in each of two mutually orthogonal directions (e.g., x- and y-directions). A surface may be described as substantially planar if a best-fit sphere has a radius greater than about 2000 mm.

The optical stack 120 may be or may include an optical film. In some embodiments, the optical film is a mirror film and in some embodiments, the optical film is a reflective polarizer. Examples of reflective polarizers include a multilayer polymer film reflective polarizer and a wire-grid polarizer which may include wires extending generally in a block axis of the reflective polarizer and disposed on a substrate which may be a polymeric substrate. In some embodiments, the optical stack 120 is an integrally formed multilayer optical film comprising a plurality of alternating polymeric layers reflecting or transmitting light primarily by optical interference. In some embodiments, the optical stack 120 includes an integrally formed multilayer optical film and at least one additional layer that is not integral with the multilayer optical film. As used herein, a first element "integrally formed" with a second element means that the first and second elements are manufactured together rather than manufactured separately and then subsequently joined. Integrally formed includes manufacturing a first element followed by manufacturing the second element on the first element. An optical film (e.g., reflective polarizer) including a plurality of layers is integrally formed if the layers are manufactured together (e.g., combined as melt streams and then cast onto a chill roll to form a cast film having each of the layers, and then orienting the cast film) rather than manufactured separately and then subsequently joined. An additional layer not integral with the integrally formed multilayer optical film means that the additional layer is not integrally formed with the multilayer optical film. For example, the additional layer may be formed separately and then subsequently adhered (e.g., laminated using an optically clear adhesive) to the multilayer optical film.

Figure 1B:
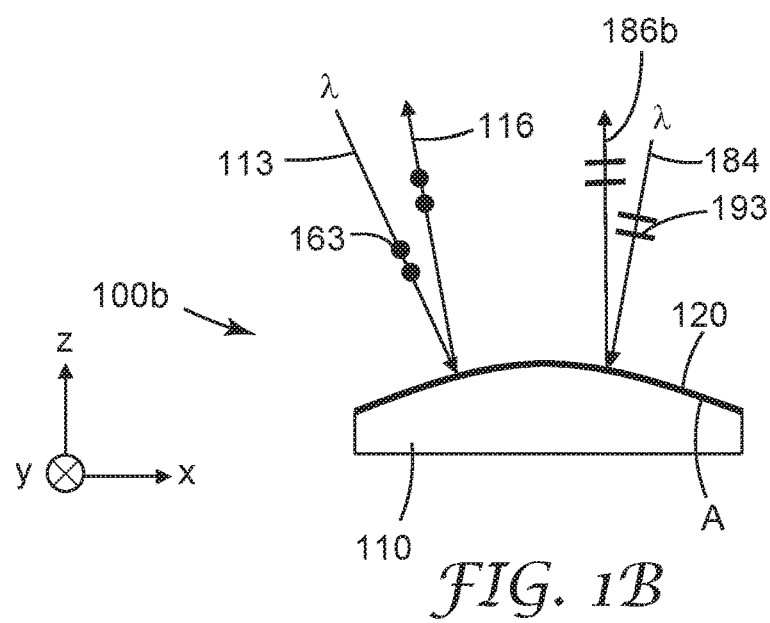

In some embodiments, an optical stack or an optical film included in the optical stack is a mirror film (e.g., visible mirror or infrared mirror) or a reflective polarizer film. Optical stack 120 of FIG. 1A is depicted as a reflective polarizer and optical stack 120b of FIG. 1B is depicted as a mirror. In some embodiments, each location over at least about 80%, or at least about 90%, or at least about 95%, or all of a total area of the optical stack 120 or an optical film included in the optical stack 120 has a reflectance greater than about 80%, or greater than about 90%, or greater than about 95% for normally incident light having a same predetermined wavelength and a same first polarization state. The predetermined wavelength may be any or all wavelengths in a predetermined wavelength range. The predetermined wavelength range may be the visible range (400 nm to 700 nm) and/or may include infrared and/or ultraviolet wavelengths. In some embodiments, the predetermined wavelength is about 550 nm.

In some embodiments, each location over at least about 80%, or at least about 90%, or at least about 95%, or all of a total area of the optical stack 120 or an optical film included in the optical stack 120 has a reflectance greater than about 80%, or greater than about 90%, or greater than about 95% for normally incident light having the same predetermined wavelength and a same second polarization state orthogonal to the first polarization state.

A polarization state can be characterized by the direction of the electric field vector which for normally incident light defines an axis tangent to the optical film. If the axis tangent to the optical film or optical stack along the electric field of normally incident light at two different locations on the optical film are in parallel planes that each intersect the optical film along a curve, the polarization states can be considered to be the same. If the axis that is tangent to the optical film or optical stack and that is perpendicular to the electric field of normally incident light at two different locations on the optical film are in parallel planes that each intersect the optical film along a curve, the polarization states can also be considered to be the same. For example, light traveling parallel to the minus z direction and incident on the apex (point with largest z-coordinate) of optical stack 120 may have a first polarization state with the electric field along the y-direction and a second polarization state with the electric field along the x-direction. The first polarization state 163 of light ray 113 is the same as the first polarization state of the light incident at the apex since the electric field vector at the point of incidence is in a plane parallel to the y-z plane in both cases. The second polarization state 193 of light ray 184 is the same as the second polarization state of the light incident at the apex since the electric field vector at the point of incidence is orthogonal to an axis (parallel to y-axis) that is tangent to the optical film and that is in a plane parallel to the y-z plane in both cases.

In some embodiments, the optical stack 120 includes an optical film where the optical film is a reflective polarizer substantially reflecting normally incident light having the predetermined wavelength and a block polarization state and substantially transmitting normally incident light having the predetermined wavelength and an orthogonal pass polarization state. Substantially reflecting can be understood to mean a reflectivity of at least 60% and substantially transmitting can be understood to mean a transmittance of at least 60%. The block polarization state of a reflective polarizer can be described as the polarization state having the lowest transmittance through the reflective polarizer and the pass polarization state is the orthogonal polarization state. The block polarization state at the center of the reflective polarizer may be the first polarization state. The block polarization state may vary (e.g., the block axis may vary by less than about 5 degrees, or less than about 2 degrees in plan view) from the first polarization state away from the center location due to variations induced by thermoforming the optical film into a curved shape, for example.

Light ray 113 having a predetermined wavelength λ is approximately normally incident on optical stack 120 in a first polarization state 163 and reflects from the optical stack 120 as reflected light ray 116. A small non-zero angle of incidence is shown for ease of illustration. In this case, the light ray 116 is schematically illustrated as entirely reflecting (reflectance of 100% and transmittance of 0%) from the optical stack 120, but optical stack 120 may have less than 100% reflectivity and may have some light in the first polarization state 163 transmitted through the optical stack 120. Light ray 184 having the predetermined wavelength λ is approximately normally incident on optical stack 120 in a second polarization state 193 and is transmitted through the optical stack 120 as transmitted light ray 186. In this case, the light ray 184 is schematically illustrated as being entirely transmitted (transmittance 100% and reflectance of 0%) from the optical stack 120, but optical stack 120 may have less than 100% transmittance and may have some light in the second polarization state 193 reflected from the optical stack 120 (e.g., due to Fresnel reflection). The first polarization state 163 may be, or may approximately (e.g., block axis within 2 degrees of axis of first polarization state 163 in plan view) be, a block polarization state of a reflective polarizer in the optical stack 120. The second polarization state 193 may be, or may approximately (e.g., pass axis within 2 degrees of axis of second polarization state in plan view) be, a pass polarization state of a reflective polarizer in the optical stack 120.

In other embodiments, the optical stack 120 includes a mirror film which substantially reflects both the first 163 and second 193 polarization states. This is illustrated in FIG. 1B which shows optical assembly 100b which is similar to optical assembly 100 except that optical stack 120 has been replaced with optical stack 120b. Optical assembly 100b may have the properties described for optical assembly 100 except for the reflection and transmission properties for the second polarization state 193. In the case of FIG. 1B, the light ray 184 is schematically illustrated as entirely reflecting (reflectance of 100% and transmittance of 0%) from the optical stack 120b, but optical stack 120b may have less than 100% reflectivity and may have some light in the second polarization state 193 transmitted through the optical stack 120b. The optical stack 120 and 120b may include an optical film which substantially determines the reflectance and transmittance of the respective optical stack.

The reflectance and/or transmittance may be specified over an area A which is some specified fraction of the total area of the optical stack or the optical film. For example, the area A may be at least about 80% of the total area and may exclude 20 percent of the total area near the perimeter of the optical stack, for example. In some embodiments, the area A is the total area of the optical stack 120 or 120b or the total area of the optical film included in the optical stack.

The optical assembly 100 may further include a second optical element (not illustrated in FIGS. 1A-1B) disposed on the optical stack 120 opposite the optical element 110. For example, the optical element 110 may be a first lens and the second optical element may be a second lens.

Figure 1C:
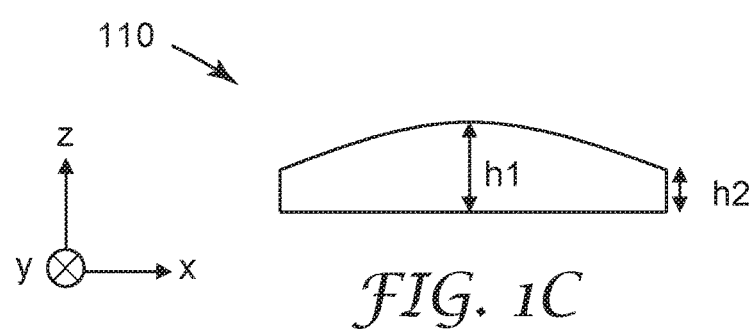
FIG. 1C is a schematic cross-sectional view of an optical element.

FIG. 1C is a schematic cross-sectional view of optical element 110 illustrating a maximum thickness h1 and a minimum thickness h2. The thickness at a location of an optical element can be described as the shortest distance through the location and through opposing major surfaces of the optical element. In some embodiments, optical element 110 is a lens. In some embodiments, the lens has a lens thickness that varies with location by no more than about 50% ((H2−H1))/H1*100% is no more than about 50%), or no more than about 30%, or no more than about 20%, or no more than about 10%. In some embodiments, the lens has a lens thickness that varies with location by at least about 20% ((H2−H1))/H1*100% is at least about 20%), or at least about 30%, or at least about 40%, or at least about 50%, or at least about 60%, or at least about 75%, or at least about 100%, or at least about 150%, or at least about 200%. A lens thickness that varies with location by at least a specified percentage will have at least one first lens location that is at least the specified percentage greater than the lens thickness at at least one second lens location. For example, if H2 is at least 1.5 times H1, then the lens thickness varies with location by at least 50% and the thickness H2 at a center location is at least 50% greater than the thickness H1 at an edge location.

Figure 2:
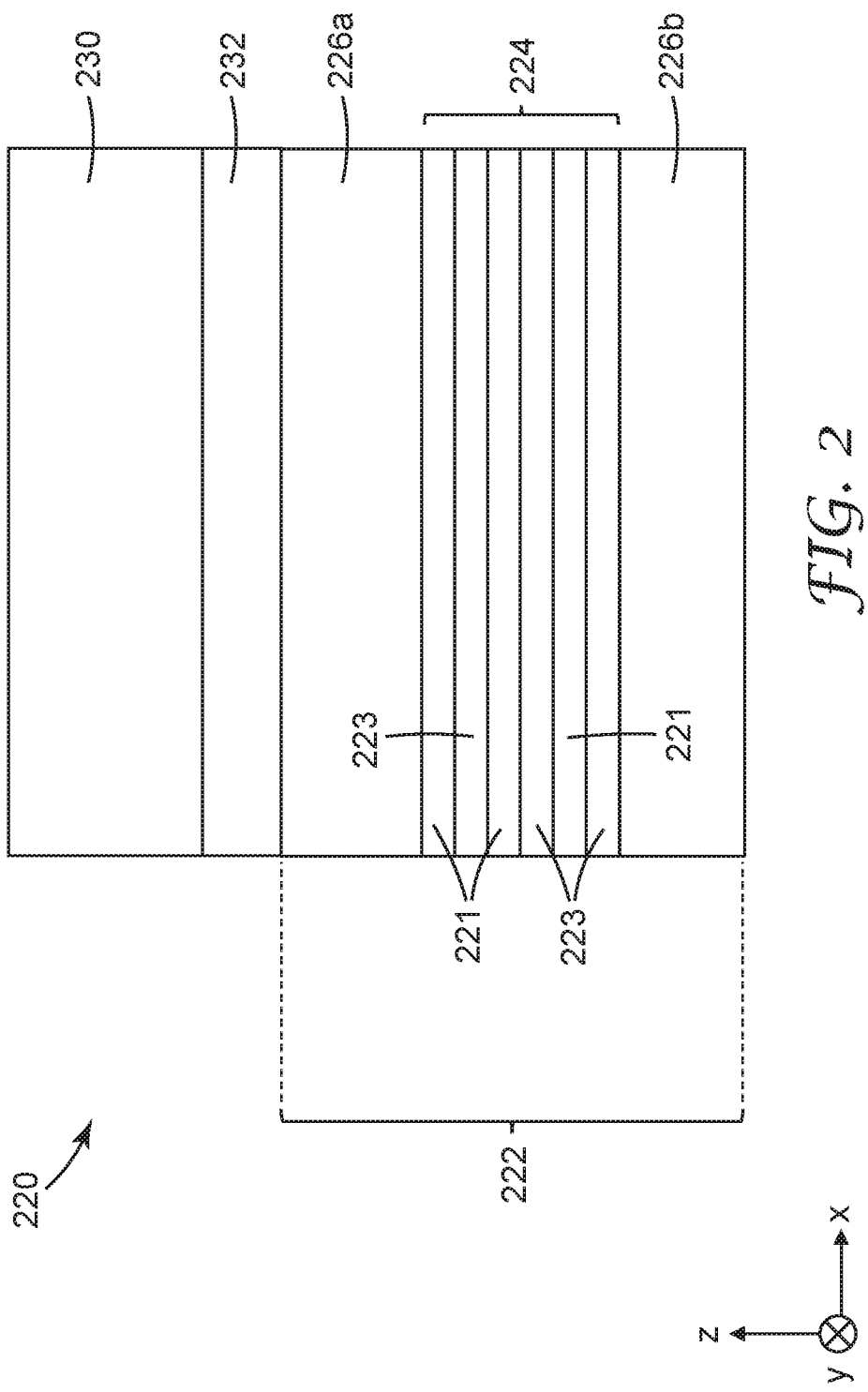
FIG. 2 is a schematic cross-sectional view of an optical stack.

FIG. 2 is a schematic cross-sectional view of an optical stack 220 including an integrally formed multilayer optical film 222 and an additional film or layer 230 bonded to the optical film 222 through an optional adhesive layer 232. The optical film 222 includes a plurality of interference layers 224 and noninterference layers 226a and 226b. The plurality of interference layers 224 include alternating first and second polymeric layers 221 and 223.

The plurality of interference layers 224 reflect or transmit light primarily by optical interference. Interference layers can be described as reflecting or transmitting light primarily by optical interference when the reflectance and transmittance of the interference layers can be reasonably described by optical interference or reasonably accurately modeled as resulting from optical interference. Such interference layers are described in U.S. Pat. No. 5,882,774 (Jonza et al.), and U.S. Pat. No. 6,609,795 (Weber et al.), for example, and can be made by coextruding a melt stream having alternating polymeric layers, casting the melt stream to form a cast film, and then orienting (biaxially for mirror films and substantially uniaxially for reflective polarizer films) the cast film to produce birefringent layers (e.g., every other layer in the interference layers can be birefringent, while every other layer remains substantially isotropic) as is known in the art. Adjacent pairs of interference layers having differing refractive indices reflect light when the pair has a combined optical thickness (refractive index times physical thickness) of ½ the wavelength of the light. Interference layers typically have a physical thickness of less than about 200 nanometers. Noninterference layers have an optical thickness too large to contribute to the reflection of visible light via interference. Typically, noninterference layers have a physical thickness of at least 1 micrometer, or at least 3 times a predetermined wavelength, or at least 3 times a largest wavelength in a predetermined range. In some embodiments, more than one noninterference layer is included. In some embodiments, at least one noninterference layer (noninterference layer 226a and 226b in the illustrated embodiment) is integrally formed with the plurality of interference layers 224 and does not reflect or transmit light primarily by optical interference.

In some embodiments, the additional layer 230 is a liner that is releasably bonded to the optical film 222. A liner that is bonded to an optical film but that can be cleanly removed from the optical film without substantially damaging the optical film may be described as releasably bonded to the optical film. In some embodiments, a liner that is releasably bonded to an optical film can be removed from the optical film with no visible damage to the optical film. In some embodiments, when a liner is removable from the optical film without substantial damage to the optical film, for each location over at least 80% of a total area of the optical film, a difference between a reflectance of the optical film at the location before and after the liner is removed is less than about 5% (e.g., absolute value of the difference in reflectance before and after the liner is removed divided by the reflectance after the liner is removed times 100% may be less than 5%), or less than about 2%, or less than about 1%. For example, in some embodiments, the optical film includes a plurality of alternating polymeric layers reflecting or transmitting light primarily by optical interference and each location over at least 80% of a total area of the optical film has a reflectance greater than about 80% for normally incident light having a same predetermined wavelength and a same first polarization state, and the liner is releasably bonded to the optical film such that a difference between the reflectance of the optical film at the location before and after the liner is removed is less than about 5%, or less than about 2%, or less than about 1%. A releasably bonded liner may include a substrate with an adhesive layer that bonds strongly to the substrate but weakly to the optical film. For example, a liner may include a thin layer of low tack adhesive applied to a substrate with a surface treated to increase its bond to the adhesive. Other suitable liners include those that electrostatically bond to the optical film as described in U.S. Pat. No. 6,991,695 (Tait et al.), for example. One example of a suitable liner is OCPET NSA33T available from Sun A Kaken Co, Ltd.

In some embodiments, the optical stack 220 is formed into a curved shape, and then an optical component is insert molded onto the optical stack opposite the additional layer 230. In some embodiments, the additional layer 230 is a liner that is attached to the optical film 222 prior to forming the optical stack 220 into a curve shape and the liner is removable from the resulting optical assembly after the optical element has been insert molded onto the optical stack 220 without substantial damage to the optical film 222.

In some embodiments, the additional layer 230 is optically clear. In some embodiments, the additional layer 230 is a protective layer which may be an optically clear protective layer. A layer (e.g., adhesive layer or a hardcoat layer) may be described as optically clear if it has a haze under transmission of less than 10%. Haze can be determined according to the ASTM D1003-13 test standard. A suitable instrument for measuring haze is the Haze-Gard Plus haze meter (BYK Gardner, Columbia, Md.).

Figure 3:
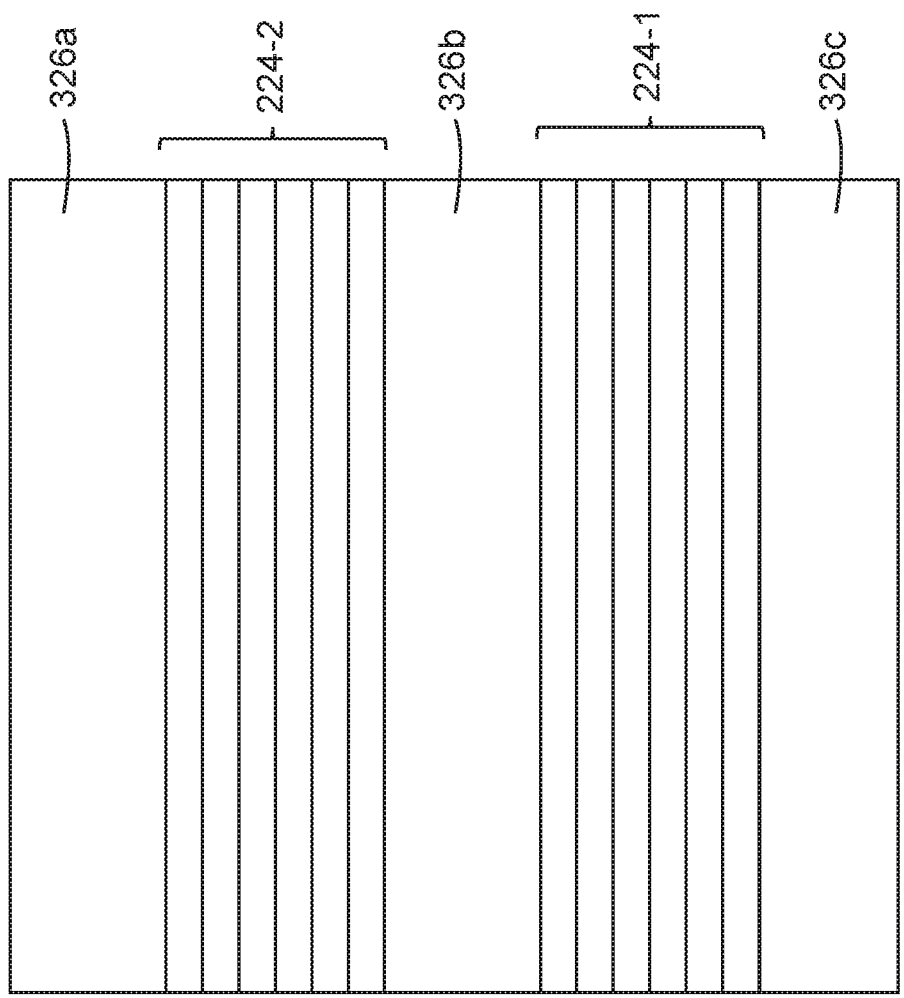
FIG. 3 is a schematic cross-sectional view of an optical film.

FIG. 3 is a schematic illustration of an optical film 322 which can optionally be used in an optical stack (e.g., replacing optical film 222 in optical stack 220). Optical film 322 includes first and second packets 224-1 and 224-2 of interference layers separated by noninterference layer 326b. The optical film 322 further includes outer noninterference layers 326a and 326c. The optical film 322 may be integrally formed. The first and second packets 224-1 and 224-2 may utilize overlapping thickness ranges as described in U.S. Prov. Pat. Appl. 62/467,712 filed Mar. 6, 2017 and titled "High Contrast Optical Film and Devices Including the Same", for example, to provide a reflective polarizer with a high contrast ratio (ratio of pass state transmittance to block state transmittance) or a mirror with a low leakage. In some embodiments, a reflective polarizer utilizing packets with overlapping thickness ranges, for example, has a block state reflectance of at least 99%, or at least 99.5%, or at least 99.8%.

In some embodiments, the optical film 222 or 322 has a reflectance greater than about 80% for normally incident light having a predetermined wavelength and a same first polarization state. In some embodiments, even after an optical film or optical stack (e.g., optical stack 220) is thermoformed into a curved shape and an optical element is molded onto the optical film or stack, the optical film 222 or 322 or other optical films of the present description still has a high reflectivity. For example, in some embodiments, each location over at least about 80%, or at least about 90%, or all of a total area of the optical film has a reflectance greater than about 80%, or greater than about 90% for normally incident light having a same predetermined wavelength and a same first polarization state. The optical film may also have a low leakage even after being formed and having an optical element molded onto the optical film. For example, in some embodiments, each location over at least about 80%, or at least about 90%, or all of a total area of the optical film has a transmittance less than about 5%, or less than about 2%, or less than about 1%, or less than about 0.6%, or less than about 0.5% for normally incident light having the same predetermined wavelength and the same first polarization state. In some embodiments, the optical film is a reflective polarizer substantially reflecting normally incident light having a predetermined wavelength and a block polarization state and substantially transmitting normally incident light having the predetermined wavelength and an orthogonal pass polarization state. In some embodiments, each location over at least about 80%, or at least about 90%, or all of a total area of the reflective polarizer has a transmittance of less than about 5%, or less than about 2%, or less than about 1%, or less than about 0.6%, or less than about 0.5% for normally incident light having the predetermined wavelength and the block polarization state.

Figure 4B:
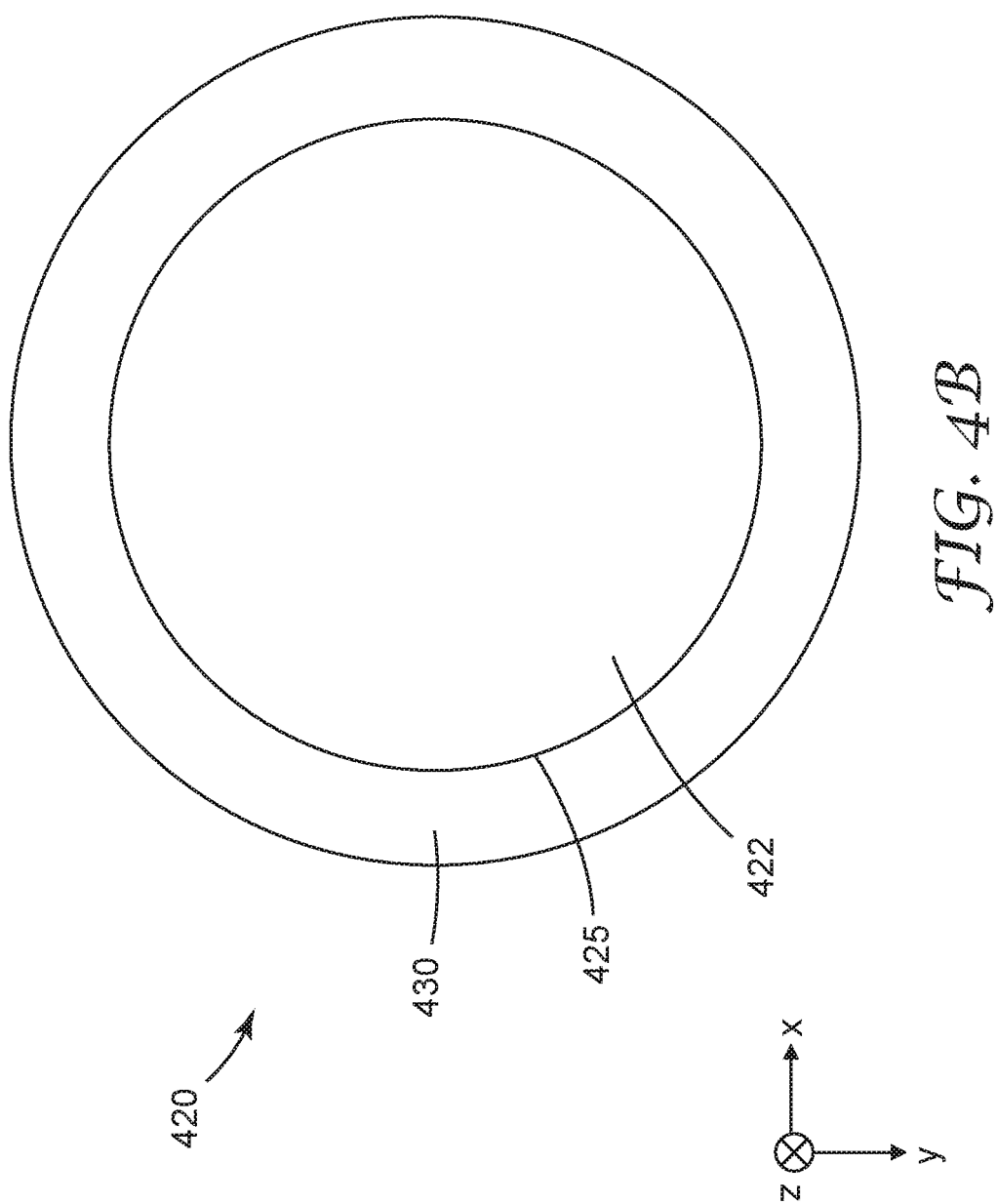
FIG. 4B is a schematic bottom view of the optical stack of FIG. 4A.

In some embodiments, an optical stack includes an optical film and an additional layer which extends beyond a perimeter of the optical film. For example, the additional layer may extend in all directions tangent to the optical film along the perimeter of the optical film. FIGS. 4A-4B are schematic side and bottom views of an optical stack 420 including optical film 422 and additional layer 430. In some embodiments, the optical film 422 is an integrally formed multilayer optical film as described further elsewhere herein (e.g., optical film 422 may correspond to optical film 222 or 322). In some embodiments, the additional layer 430 is a protective layer (e.g., optically clear hardcoat) or a liner. In some embodiments, the additional layer 430 is a liner releasably bonded to the optical film 422. Optical film 422 has a perimeter 425 and the additional layer 430 completely covers the optical film 422 and extends beyond the perimeter 425 of the optical film 422. In some embodiments, the interface 428 between the additional layer 430 and the optical film 422 is optically smooth. In other embodiments, the interface 428 is textured. A surface is optically smooth if it is sufficiently smooth that there is substantially no scattering due to surface roughness. For example, if the surface roughness parameter Ra is significantly less than the wavelength of visible light (e.g., less than 50 nm) the optical effect from the surface roughness can be neglected and the surface can be described as optically smooth. A textured surface typically includes textures having a large enough amplitude that the surface is not optically smooth.

In some embodiments, the additional layer 430, or other additional layers described elsewhere herein, is a protective layer (e.g., a layer formed by curing a coating), or a protective film (e.g., a film with a protective coating). In some embodiments, the protective coating comprises an at least partially cured composition comprising:

a) 70 to 90 weight percent of a urethane (meth)acrylate compound having an average (meth)acrylate functionality of 3 to 9, based on the total weight of components a) to d);

b) 5 to 20 weight percent of a (meth)acrylate monomer having a (meth)acrylate functionality of 1 to 2, based on the total weight of components a) to d), where the (meth)acrylate monomer is not a urethane (meth)acrylate compound;

c) 0.5 to 2 weight percent of silicone (meth)acrylate, based on the total weight of components a) to d); and d) optional effective amount of photoinitiator.

Such protective coatings are described further in U.S. Prov. Pat. App. No. 62/549,082 filed on Dec. 16, 2016, titled "Infrared-Reflecting Optically Transparent Assembly and Method of Making the Same" and hereby incorporated herein by reference to the extent that it does not contradict the present description. The composition can be coated onto the optical film and then cured prior to forming (e.g., thermoforming) the optical film into the desired shape.

The prefix "(meth)acryl" refers to methacryl and/or acryl. "Urethane (meth)acrylate compound" means a compound having at least one (preferably at least 2, 3, 4, or more) carbamate group (i.e., —NHC(=O)O—) and at least one (meth)acryl group. By definition, the total of weight percentages of ingredients in a composition cannot exceed 100 weight percent.

Exemplary urethane (meth)acrylate compounds having an average (meth)acrylate functionality of 3 to 9 are available from commercial sources, and/or can be prepared according to known methods. Commercially available urethane (meth)acrylate compounds include EBECRYL 264 aliphatic urethane triacrylate, EBECRYL 265 aliphatic urethane triacrylate, EBECRYL 1258 aliphatic urethane triacrylate, EBECRYL 4100 aliphatic urethane triacrylate, EBECRYL 4101 aliphatic urethane triacrylate, EBECRYL 8412 aliphatic urethane acrylate (trifunctional), EBECRYL 4654 aliphatic urethane triacrylate, EBECRYL 4666 aliphatic urethane triacrylate, EBECRYL 4738 aliphatic allophanate urethane triacrylate, EBECRYL 4740 aliphatic allophanate urethane triacrylate, EBECRYL 8405 aliphatic urethane tetraacrylate, EBECRYL 8604 aliphatic urethane tetraacrylate, EBECRYL 4500 aromatic urethane tetraacrylate, EBECRYL 4501 aromatic urethane tetraacrylate, EBECRYL 4200 aliphatic urethane tetraacrylate, EBECRYL 4201 aliphatic urethane tetraacrylate, EBECRYL 8702 aliphatic urethane hexaacrylate, EBECRYL 220 aromatic urethane hexaacrylate, EBECRYL 221 aromatic urethane hexaacrylate, EBECRYL 2221 aromatic urethane hexaacrylate, EBECRYL 2221 aromatic urethane hexaacrylate, EBECRYL 5129 aliphatic urethane hexaacrylate, EBECRYL 1290 aliphatic urethane hexaacrylate, EBECRYL 1291 aliphatic urethane hexaacrylate, EBECRYL 8301-R aliphatic urethane hexaacrylate, EBECRYL 8602 aliphatic urethane acrylate (nonafunctional), all from Allnex, Brussells, Belgium; and CN929 trifunctional urethane acrylate and CN9006 aliphatic urethane acrylate (hexafunctional) from Sartomer Co., Exton, Pa. In some embodiments, the urethane (meth)acrylate compound can be synthesized by reacting a polyisocyanate compound with a hydroxyl-functional (meth)acrylate compound. A variety of polyisocyanates may be utilized in preparing the urethane (meth)acrylate compound. As used herein, the term "polyisocyanate" means any organic compound that has two or more reactive isocyanate (—NCO) groups in a single molecule such as, for example, diisocyanates, triisocyanates, tetraisocyanates, and mixtures thereof. For improved weathering and diminished yellowing the, urethane (meth)acrylate compound(s) employed herein are preferably aliphatic and therefore derived from an aliphatic polyisocyanate.

The average (meth)acrylate functionality is calculated in the following fashion. The functionality of the added acrylates for each compound is first calculated. For instance, a composition may include 1.0 equivalent of DESN100 (DESMODUR N100 biuret-based hexamethylene diisocyanate oligomer, 100% solids, 22.0 wt. % NCO, 191 g/eq., available from Covestro LLC, Pittsburgh, Pa.), 0.25 equivalents of HEA (2-hydroxyethyl acrylate, available from Alfa Aesar, Tewksbury, Mass.), and 0.75 equivalents of PET3A (pentaerythritol triacrylate, available from Sartomer Co., Exton, Pa., as SR444C). This means that the compound is the reaction product of 1 equivalent of isocyanate groups (as DESN100) and 0.25 hydroxyl equivalents of hydroxyethyl acrylate and 0.75 hydroxyl equivalents of PET3A. The HEA has 1 acrylate group per hydroxyl group and the PET3A has 3 acrylate groups per hydroxyl group. The functionality of added acrylates for this compound is then (0.25*1)+(0.75*3) or 2.5. The average (meth)acrylate functionality is found by multiplying the functionality of the added acrylates for each compound by the average functionality of the polyisocyanate. According to Covestro, the average functionality for DESN100 is 3.6, so the average (meth)acrylate functionality for the compound is at 2.5*3.6 or 9. Other estimated average functionality of polyisocyanates for DESN3300, DESN3800, and DESZ4470BA are 3.5, 3.0, and 3.3 respectively.

In some embodiments, some of the isocyanate groups on the polyisocyanate can be reacted with a polyol such as, for example, an alkoxylated polyol available from Perstorp Holding AB, Sweden as Polyol 4800. Such polyols can have a hydroxyl number of 500 to 1000 mg KOH/g and a molecular weight ranging from at least 200 or 250 g/mole up to 500 g/mole.

In some embodiments, some of the isocyanate groups on the polyisocyanate can be reacted with a polyol such as 1,6-hexanediol.

Selection of reaction conditions used to react the polyisocyanate with (meth)acrylated alcohols, and choice of catalyst, if any, will be apparent to those of skill in the art.

Useful (meth)acrylate monomers (which are preferably non-urethane, and preferably non-silicone, although this is not a requirement) have a (meth)acrylate functionality of 1 to 2. These monomers may function as diluents or solvents, as viscosity reducers, as binders when cured, and as crosslinking agents, for example. Examples of useful (meth) acrylates include mono(meth)acrylates such as octyl (meth) acrylate, nonylphenol ethoxylate (meth)acrylate, isononyl (meth)acrylate, isobornyl (meth)acrylate, 2-(2-ethoxyethoxy)ethyl (meth)acrylate, 2-ethylhexyl (meth)acrylate, lauryl (meth)acrylate, beta-carboxyethyl (meth)acrylate, isobutyl (meth)acrylate, 2-hydroxyethyl (meth)acrylate, isodecyl (meth)acrylate, dodecyl(meth)acrylate, n-butyl (meth) acrylate, methyl (meth)acrylate, hexyl (meth)acrylate, (meth)acrylic acid, stearyl (meth)acrylate, hydroxy functional caprolactone ester (meth)acrylate, isooctyl (meth) acrylate, hydroxymethyl (meth)acrylate, hydroxypropyl (meth)acrylate, hydroxyisopropyl (meth)acrylate, hydroxybutyl(meth)acrylate, hydroxyisobutyl (meth)acrylate, tetrahydrofurfuryl (meth)acrylate, and alkoxylated versions of the above (meth(acrylate monomers, such as alkoxylated tetrahydrofurfuryl (meth)acrylate and combinations thereof. Tetrahydrofurfuryl (meth)acrylate is preferred in some embodiments; di(meth)acrylates such as 1,6-hexanediol di(meth)acrylate, poly(ethylene glycol) di(meth)acrylates, polybutadiene di(meth)acrylates, polyurethane di(meth) acrylates, ethylene glycol di(meth)acrylate, hexanediol di(meth)acrylate, diethylene glycol di(meth)acrylate, triethylene glycol di(meth)acrylate, tetraethylene glycol di(meth) acrylate, neopentyl glycol di(meth)acrylate, alkoxylated versions of the above di(meth)acrylates, and combinations thereof. Of these, 1,6-hexanediol diacrylate is preferred n some embodiments. (Meth)acrylate monomers having a functionality of 1 or 2 (e.g., as listed above) are widely commercially available.

Exemplary useful silicone (meth)acrylates include mono- and polyfunctional silicone (meth)acrylates. Of these, silicone poly(meth)acrylates may be preferred because the likelihood of unbound silicone (meth)acrylate after curing is generally reduced. Exemplary silicone (meth)acrylates include EBECRYL 350 silicone diacrylate and EBECRYL 1360 silicone hexaacrylate from Allnex, CN9800 aliphatic silicone acrylate and CN990 siliconized urethane acrylate compound from Sartomer Co., and TEGO RAD 2100, TEGO RAD 2250, and TEGO RAD 2500 silicone polyether acrylate from Evonik Industries, Parsippany, N.J.

The curable composition may optionally, but preferably, further comprise an effective amount of photoinitiator. By the term "effective amount" is meant an amount that is at least sufficient amount to cause curing of the curable composition under ambient conditions. It will be recognized that curing may be complete even though polymerizable (meth) acrylate groups remain.

Exemplary photoinitiators include α-cleavage photoinitiators such as benzoin and its derivatives such as α-methylbenzoin; α-phenylbenzoin; α-allylbenzoin; α-benzylbenzoin; benzoin ethers such as benzil dimethyl ketal (available as IRGACURE 651 from Ciba Specialty Chemicals, Tarrytown, N.Y.), benzoin methyl ether, benzoin ethyl ether, benzoin n-butyl ether; acetophenone and its derivatives such as 2-hydroxy-2-methyl-1-phenyl-1-propanone (available as DAROCUR 1173 from Ciba Specialty Chemicals) and 1-hydroxycyclohexyl phenyl ketone (available as IRGACURE 184 from Ciba Specialty Chemicals); 2-methyl-1-[4-(methylthio)phenyl]-2-(4-morpholinyl)-1-propanone (available as IRGACURE 907 from Ciba Specialty Chemicals); 2-benzyl-2-(dimethylamino)-1-[4-(4-morpholinyl)phenyl]-1-butanone (available as IRGACURE 369 from Ciba Specialty Chemicals); titanium complexes such as bis($\eta$5-2,4-cyclopentadien-1-yl)bis[2,6-difluoro-3-(1H-pyrrol-1-yl)phenyl] titanium (available as CGI 784 DC from Ciba Specialty Chemicals); and mono- and bis-acylphosphines (available from Ciba Specialty Chemicals as IRGACURE 1700, IRGACURE 1800, IRGACURE 1850, and DAROCUR 4265). One useful photoinitiator, a difunctional alpha hydroxyketone, is available as ESACURE ONE from Lamberti S.p.A, Albizzate, Italy.

FIG. 4C illustrates an alternate embodiment where the optical stack 420c includes first and second layers 430c and 430b in addition to the optical film 422. First layer 430c extends beyond the perimeter 425 of the optical film 422, but second layer 430b does not. In some embodiments, the second layer 430b is a protective layer (e.g., a hardcoat) and the first layer 430c is a liner.

In some embodiments, an optical stack includes an optical film having an interface between a first major surface of the liner and an outermost major surface of the optical film. The interface may be optically smooth or may be textured. It may be desired for the interface to be optically smooth in some applications (e.g., to provide specular reflection) and textured in others (e.g., to add some degree of diffuse character to otherwise specular reflection). FIG. 4D is a schematic cross-sectional view of optical stack 420d including a liner 430d, an optical film 422d and a textured interface 428d therebetween. Optical films often start with an optically smooth surface, but the surface can become textured in subsequent film processing. The interface may be textured due to a forming process, for example. In some embodiments, the optical film may be formed into a desired shape in a thermoforming process, for example, and a texture from a mold used in the thermoforming process may by imparted to an outer surface of the optical film which is subsequently covered by a liner. The texture in the mold may be designed into the mold or may be an artifact of how the mold was made, for example. In other embodiments, a liner (which may or may not be the same liner used in a subsequent insert molding process) is applied to the optical film prior to thermoforming and any texture from the mold is not imparted to the optical film.

Figure 5A:
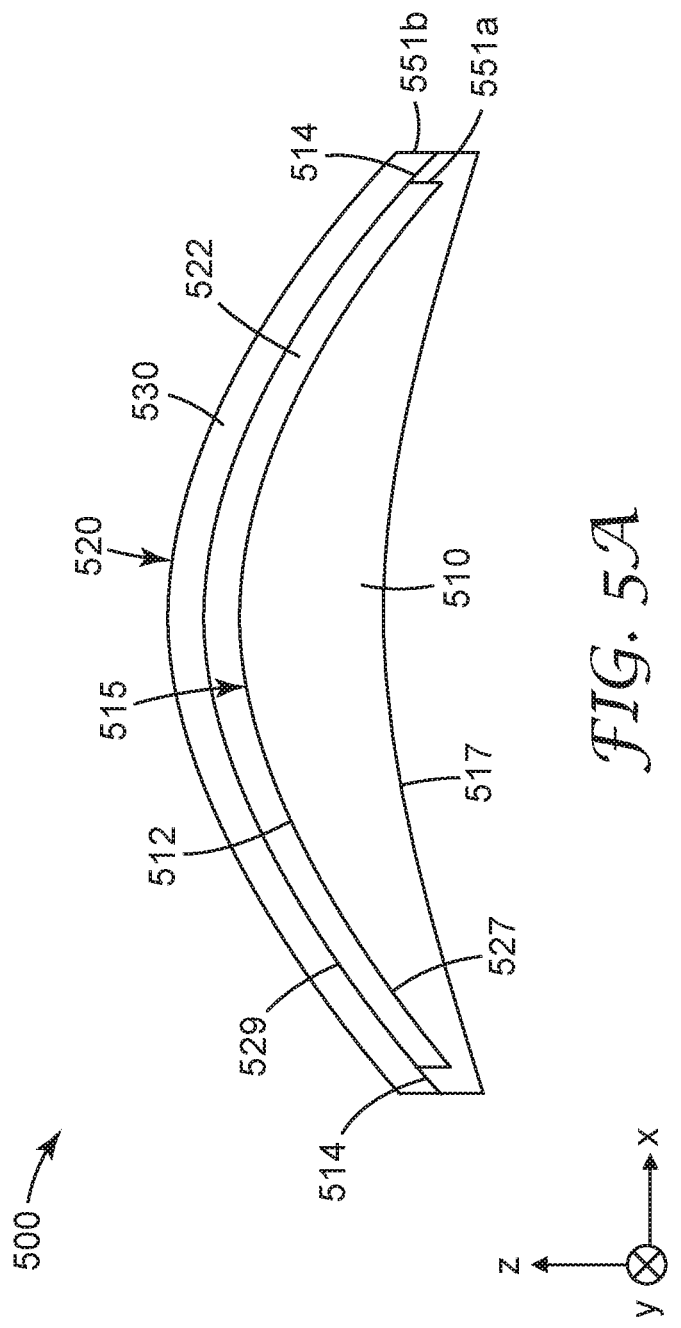
FIGS. 5A-5B are schematic cross-sectional views of optical assemblies.

FIG. 5A is a schematic cross-sectional view of optical assembly 500 including a lens having opposing first and second major surfaces 515 and 517 and an optical stack 520 disposed on the lens 510. The first major surface 515 includes a first portion 512 and a second portion 514. The optical stack includes an optical film 522 and an optional additional film or layer 530. The additional layer 530 may also be referred to as a first layer. More than one additional layer 530 may be included. For example, the additional layers may include a first layer disposed on the optical film 522 and a second layer disposed on the first layer opposite the lens 510 (e.g., the first layer may be a hardcoat and the second layer may be a liner). The optical film 522, which may be a multilayer optical film as described further elsewhere herein, has first and second major surfaces 527 and 529. The first major surface 527 of the optical film 522 is disposed on the first portion 512 of the first major surface 515 of the lens 510. The optical film 522 is disposed between the lens 510 and the additional layer 530, which may be a liner or a protective layer, for example. In some embodiments, the optical film 522 is an integrally formed multilayer optical film and the additional layer 530 is not integral with the optical film 522.

The second major surface 529 is substantially flush with the second portion 514 of the first major surface 515. A major surface of a film or layer may be described as substantially flush with another surface (or the other surface substantially flush with the major surface of the film or layer) if a separation between the major surface and the other surface is no more than about 30% of the thickness of the film or layer. In some embodiments, the separation between the major surface of the film or layer and the other surface is no more than 20%, or no more than 10% of the thickness of the film or layer.

The second portion 514 of the first major surface 515 may extend vertically from the first portion 512 of the first major surface 515 as schematically illustrated in FIG. 5A, of the second portion 514 may extend at some angle from the first portion 512. The precise angle may be determined by the shape of the edge of the optical film 522 when the lens is insert molded onto the optical stack 520. The shape of the edge may depend on how the optical film 522 was cut out from a larger film (e.g., a roll of the optical film).

Figure 5B:
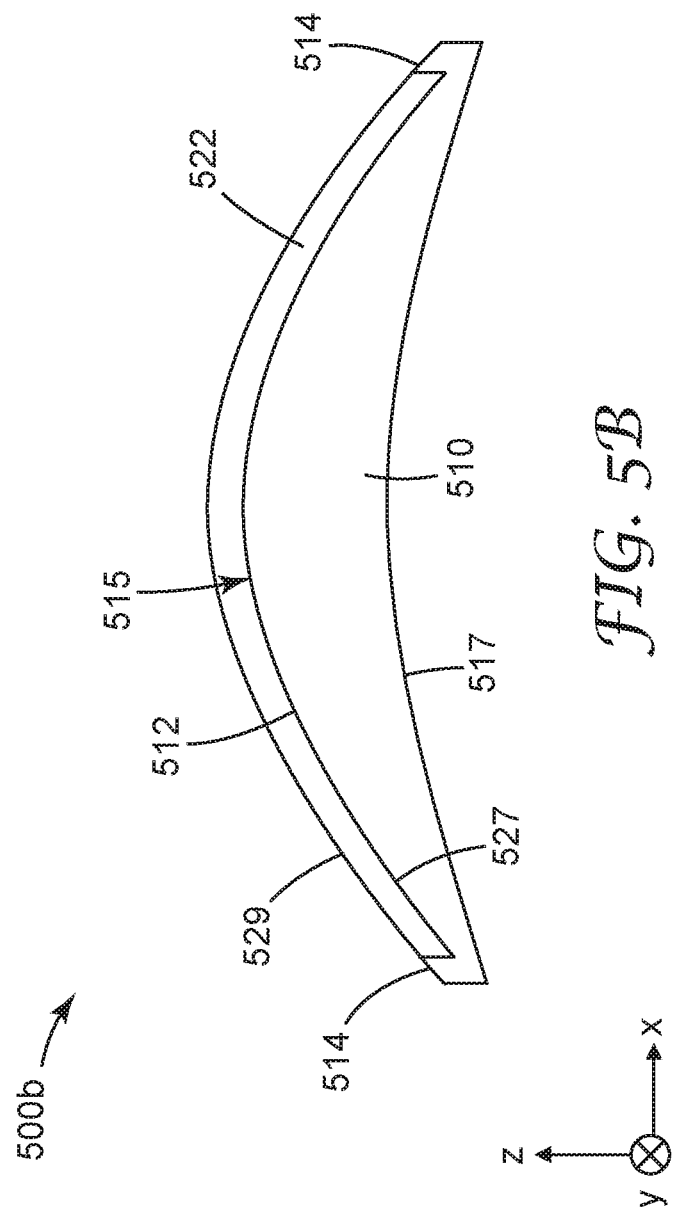

In some embodiments, the additional layer 530 is not included. In some embodiments, the optical assembly 500 is formed with the additional layer 530 being a liner that is subsequently removed. FIG. 5B is a schematic illustration of optical assembly 500b which can be formed, for example, by removing the additional layer 530 from the optical assembly 500.

Figure 5C:
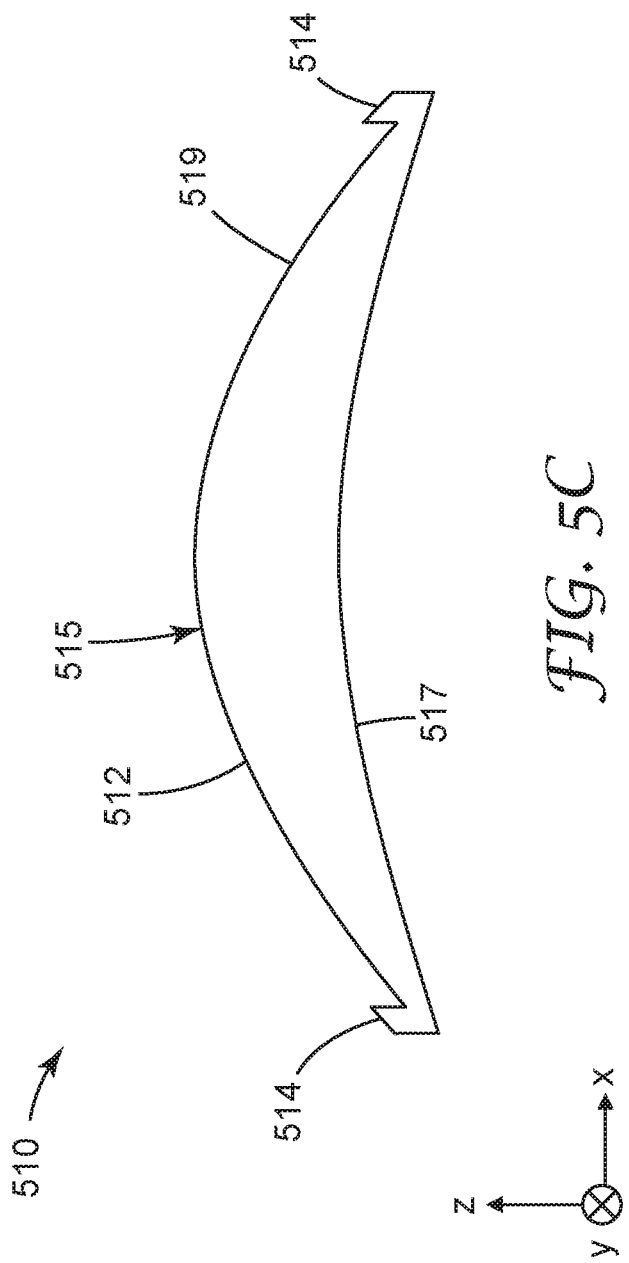
FIG. 5C is a schematic cross-sectional view of a lens.
Figure 5D:
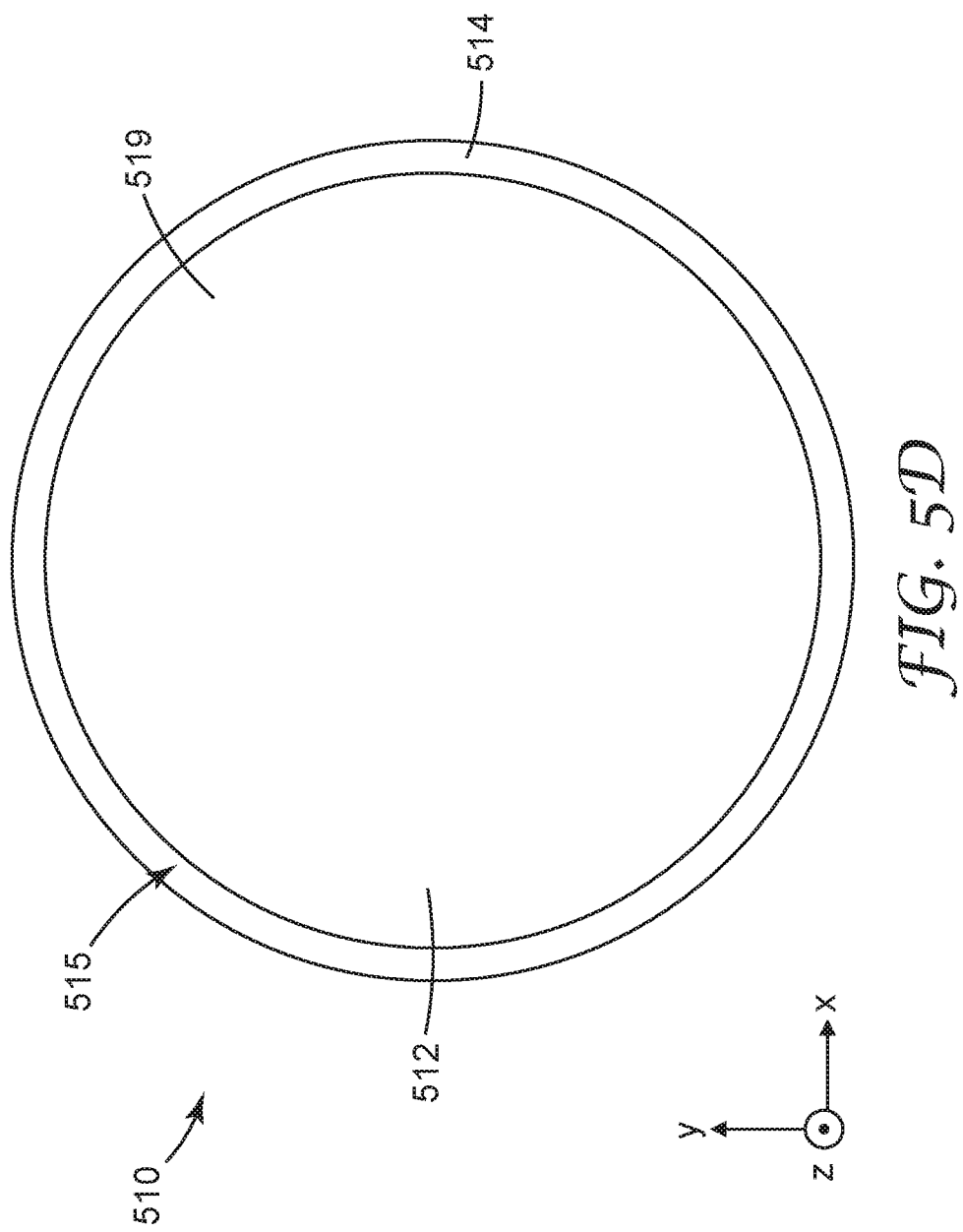
FIG. 5D is a schematic top view of the lens of FIG. 5C.

FIG. 5C is a schematic cross-sectional view of lens 510 without optical film(s) disposed on the first major surface 515 and FIG. 5D is a schematic top view of the lens 510. The first major surface 515 may be described as defining a curved recess 519. In the illustrated embodiment, the curved recess 519 extends over the first portion 512 of the first major surface 515 and is bounded by the second portion 514 of the first major surface 515.

In the embodiment illustrated in FIG. 5A, the lens 510 may be described as at least partially wrapping around an edge of the optical stack 520. The edge of the optical stack 520 includes an edge 551a of the optical film 522 and an edge 551b of the additional layer 530. In the illustrated embodiment, the lens 510 at least partially wraps around the edge 551a of the optical film 522 portion of the optical stack 520 to be flush with the optical film 522. Other optical elements, such as a prism, for example, may be molded onto an optical film and may at least partially wraps around the edge of the optical film and to optionally be flush with the optical film.

Figure 6A:
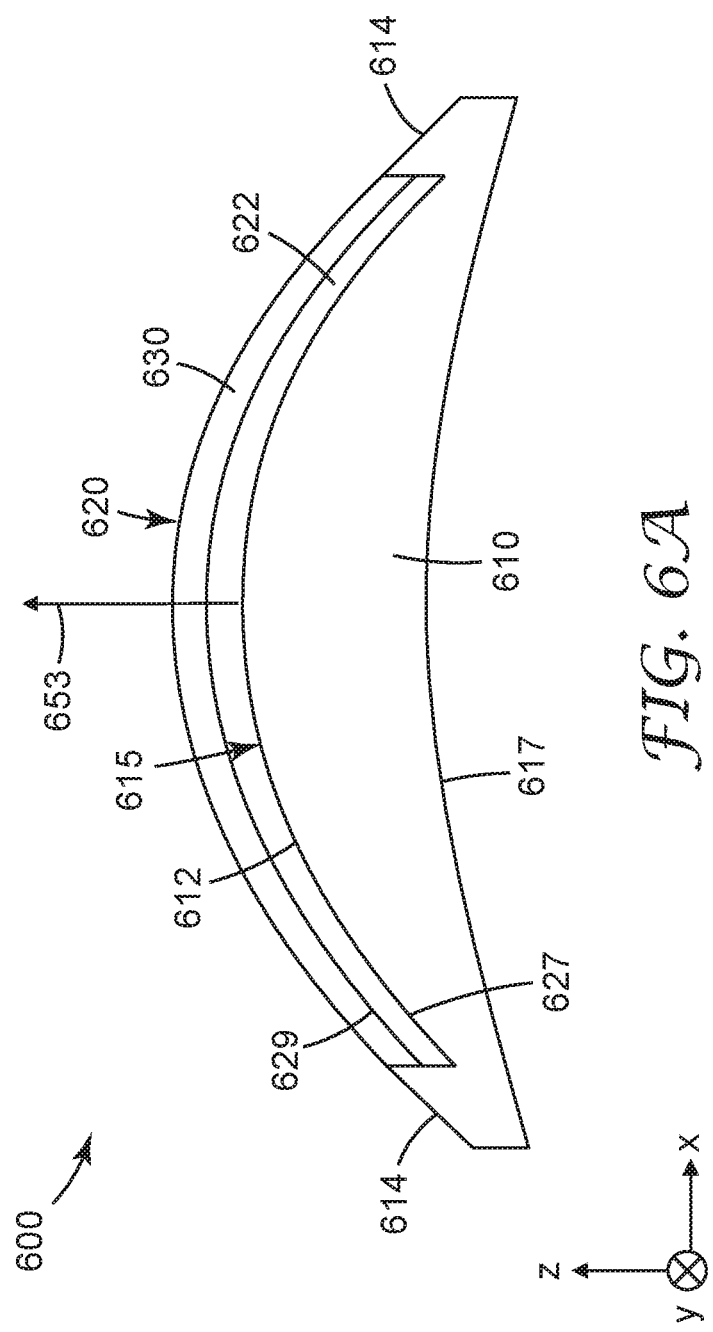
FIGS. 6A-6B are schematic cross-sectional views of optical assemblies.

In other embodiments, the lens may also at least partially wrap around the edge of the additional layer. FIG. 6A is a schematic cross-sectional view of an optical assembly 600 which includes an optical stack 620 disposed on a first portion 612 of a first major surface 615 of a lens 610. The lens 610 has a second major surface 617 opposite the first major surface 615. The optical stack 620 includes a multilayer optical film 622 and an additional layer or film 630 disposed on the multilayer optical film 622. The lens 610 at least partially wraps around an edge of the optical stack 620. In the illustrated embodiment, the lens 610 warps around an edge of the optical film 622 and at least partially wraps around an edge of the additional film 630. In some embodiments, the lens 610 at least partially wraps around an edge of the additional film 630 to be flush with the additional film 630. For example, an outermost major surface of the additional film 630 opposite the first portion 612 may be flush with the second portion 614 of the first major surface 615.

The multilayer optical film 622 includes a first major surface 627 disposed on the first portion 612 and includes an opposite second major surface 629. In some embodiments, the lens fully wraps around an edge of the multilayer optical film 622 and extends past the second major surface 629 of the multilayer optical film 622 in a direction parallel to a normal 653 to the lens 610 at a center of the first major surface 615 the lens 610.

Figure 6B:
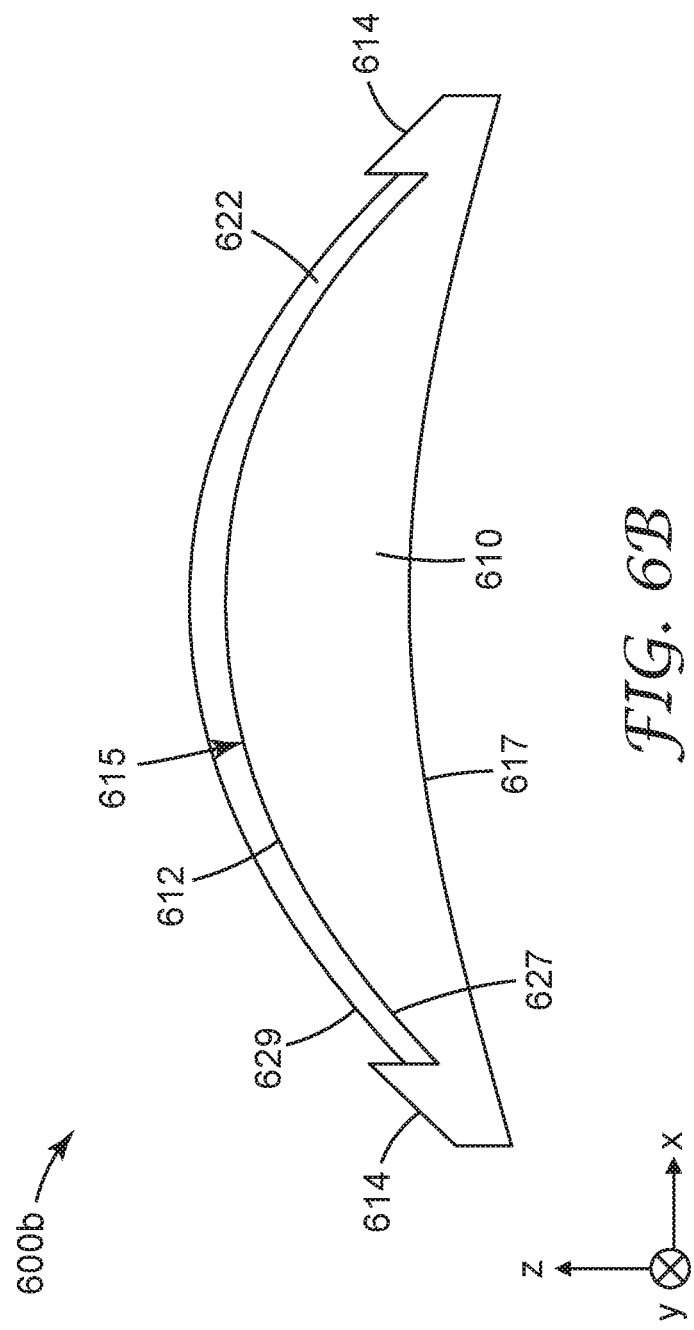

In some embodiments, the additional film 630 is a protective film (e.g., a hardcoat). In some embodiments, the additional film 630 is a releasably attached liner. FIG. 6B is a schematic cross-sectional view of an optical assembly 600b which corresponds to optical assembly 600 except that the additional layer 630 has been removed.

In some embodiments, the lens has a first major surface defining a curved recess therein and a multilayer optical film is adhered to and conforms to the curved recess. For example, any of the embodiments illustrated in FIGS. 5A-5B and 6A-6B can be described as having an optical film conforming to a curved recess defined by the first major surface. An optical film can be adhered to the curved recess by being diffusion bonded to the lens via diffusion bonding, for example, as described further elsewhere herein. Alternatively, the lens can be formed separately and the optical film bonded to the curved recess with an optically clear adhesive, for example.

In some embodiments, an optical film disposed on an optical element is convex toward the optical element. In some embodiments, an optical film disposed on an optical element is concave toward the optical element. In some embodiments, an optical film is adhered to and conforms to a convex surface (e.g., a convex surface of a curved recess). In some embodiments, an optical film is adhered to and conforms to a concave surface (e.g., a concave surface of a curved recess). In some embodiments, an optical film is adhered to and conforms to a planar surface.

Figure 7A:
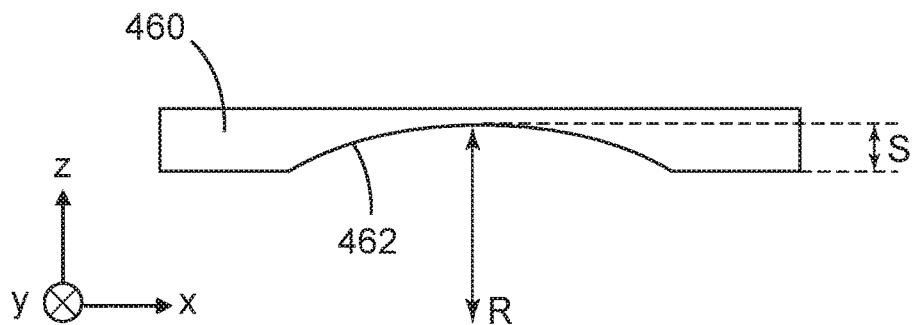
FIGS. 7A-7E illustrate processes for injection insert molding an optical element onto an optical film.
Figure 7B:
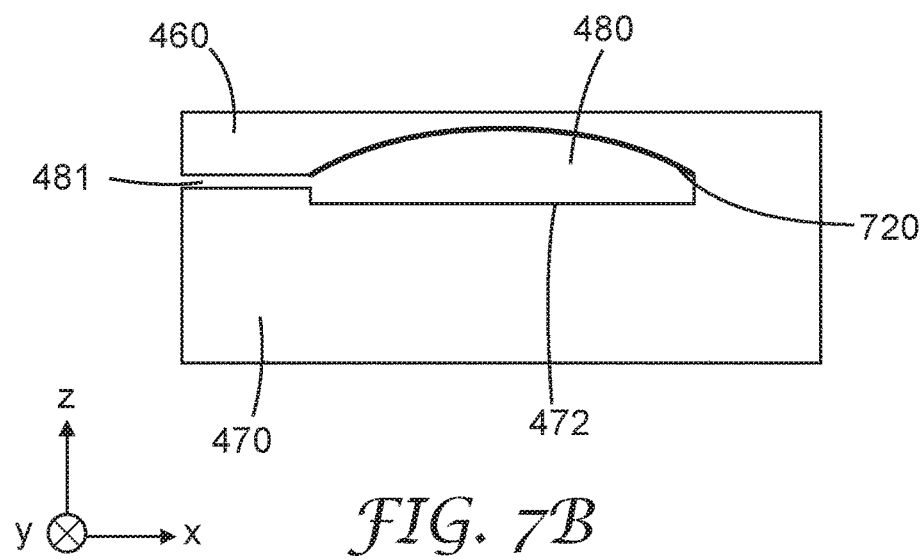
Figure 7C:
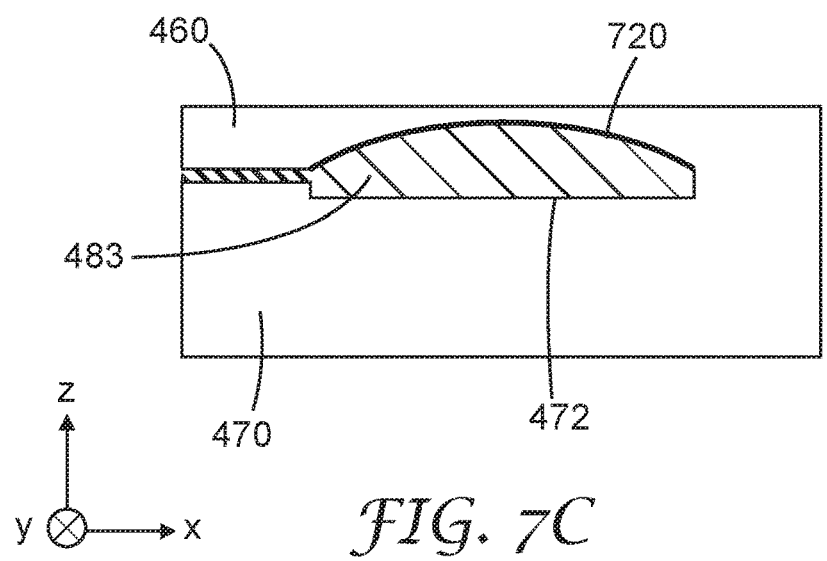

FIGS. 7A-7C schematically illustrate a method of fabricating an optical assembly. The method includes providing a first mold 460 having a first curved mold surface 462 (FIG. 7A), and placing a shaped optical film or optical stack 720 on the first curved mold surface 462 (FIGS. 7B-7C). The optical stack is preferably shaped (e.g., via thermoforming) into a desired shape which substantially matches that of the first curved mold surface 462. Thermoforming of a film or optical stack can be carried out by heating the film or optical stack, contacting the optical stack with a curved mold while stretching the optical stack as generally described by U.S. Pat. No. 9,557,568 (Ouderkirk et al.) and U.S. Pat. No. 6,788,463 (Merrill et al.), for example. Next, a second mold 470 is disposed such that a second mold surface 472 of the second mold 470 is spaced apart from and aligned with the first curved mold surface 462. The second mold surface 472 may be curved or substantially planar as illustrated. The first and second mold surfaces 462 and 472 define a mold cavity 480 therebetween (FIG. 7B). Next, the mold cavity 480 is filled or substantially filed with a flowable material 483 (FIG. 7C) which is then solidified to form a solid optical element bonded to the optical stack 720 (see, e.g., optical element 110 optical assembly 100). The flowable material 483 may be introduced into the mold cavity 480 via gate 481. The first and second molds 460 and 470 may be removed and any excess material (e.g., runner material from gate 481) removed. Substantially filling the mold cavity can be understood to mean filling the mold cavity to greater than 50 percent by volume. In some embodiments, the mold cavity is filled to at least 80 percent by volume, or to at least 90 percent by volume, or to at least 95 percent by volume. In some embodiments, the mold cavity 480 is completely filled with flowable material 483 except for the volume occupied by the optical stack 720.

In some embodiments, the flowable material 483 has a temperature greater than a glass transition temperature of the optical stack 720 when the flowable material 483 flows into the cavity 480. In some embodiments, the first and second molds 460 and 470 are held at a temperature below a melting point of the flowable material 483 in order to solidify the flowable material 483. In some embodiments, the temperature of the first and second molds 460 and 470 are also below the glass transition temperature of the optical stack 720 when the flowable material 483 flows into the cavity 480. For example, the flowable material 483 may have a temperature in a range of 250 to 300° C. when it is introduced into the cavity 480, the first and second molds may have a temperature in a range of 75 to 100° C., and the optical stack 720 may have a glass transition temperature in a range of 105 to 130° C. In some embodiments, the optical stack 720 has multiple layers and the flowable material 483 has a temperature greater than a glass transition temperature of each layer of the optical stack 720 when the flowable material 483 flows into the cavity 480. In some embodiments, the optical stack 720 has multiple layers and the flowable material 483 has a temperature greater than a glass transition temperature of at least one layer of the optical stack 720 when the flowable material 483 flows into the cavity 480. In some embodiments, the optical stack 720 has multiple layers and the flowable material 483 has a temperature greater than a glass transition temperature of the layer of the optical stack 720 immediately adjacent the flowable material 483 when the flowable material 483 flows into the cavity 480 and contacts the optical stack 720. This layer may be a skin layer of an integrally formed optical film included in the optical stack 720, for example. In some embodiments, the optical stack 720 comprises multiple layers include birefringent polymeric layers and the and the flowable material 483 has a temperature greater than a glass transition temperature of the birefringent polymeric layers when the flowable material 483 flows into the cavity 480.

In some embodiments, a melting temperature of the formed optical element is substantially larger than the glass transition temperature of the optical film or optical stack (the glass transition temperature may be any of the glass transition temperatures described above). A substantially larger temperature refers to a temperature greater than 10° C. larger unless indicated differently. In some embodiments, the melting temperature of the optical element is at least about 50° C. larger, or at least about 80° C. larger than the glass transition temperature of the optical film. In some embodiments, an absolute value of a difference between the melting temperature of the optical element and a melting temperature of the optical film is less than about 50° C., or less than about 30° C., or less than about 20° C., or less than about 10° C. In some embodiments, a melting temperature of the optical element is about the same as a melting temperature of the optical film. About the same temperature refers to temperatures differing by less than 10° C. unless indicated differently. The melting temperature of the optical film can be the melting temperature any of the layers described for the glass transition temperature. For example, the melting temperature may be the layer of the optical film immediately adjacent the flowable material 483 when the flowable material 483 flows into the cavity 480 and contacts the optical film.

In some embodiments, the optical stack 720 includes a liner as described elsewhere herein. In some embodiments, the liner has a glass transition temperature greater than about 50° C. or greater than about 80° C.

The glass transition temperature of the various films or layers can be determined by differential scanning calorimetry as described in the test standard ASTM E1356-08(2014) "Standard Test Method for Assignment of the Glass Transition Temperatures by Differential Scanning calorimetry".

In some embodiments, the first mold 460 is a first mold insert which is configured to be placed in a mold base. Similarly, in some embodiments, second mold 470 is a second mold insert which is configured to be placed in a mold base.

The first curved mold surface 462 has a best-fit spherical first radius of curvature R which, in some embodiments, is in a range from about 30 mm to about 1000 mm. The first curved mold surface 462 has a sag S. In some embodiments, a ratio of the sag S to the best-fit spherical first radius of curvature R is in a range of about 0.02 to about 0.2, or in a range of about 0.02 to about 0.15, or in a range of about 0.02 to about 0.12, or in a range of about 0.03 to about 0.12, or in a range of about 0.04 to about 0.12. In some embodiments, the optical stack 720 has a sag to radius ratio in any of these ranges.

Figure 7D:
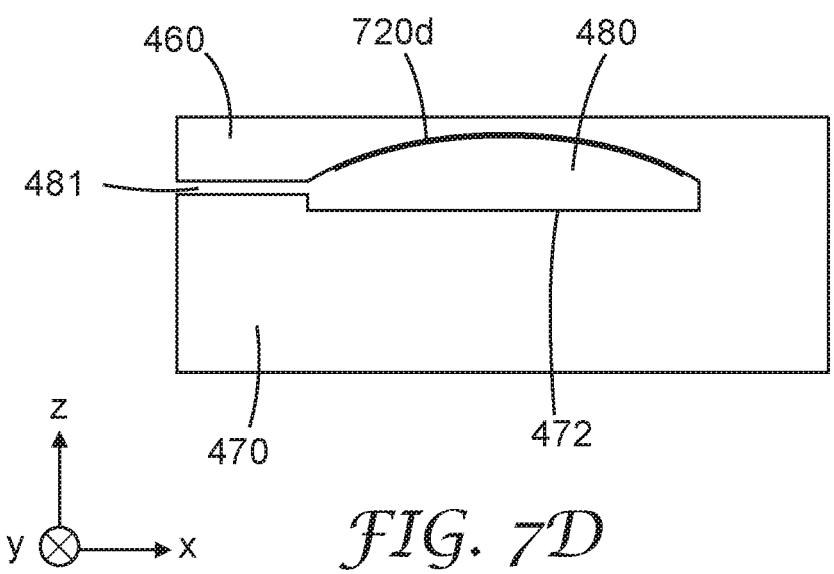

FIG. 7D is a schematic cross-sectional view of an alternative optical stack 720d disposed on the first curved mold surface 462 of the first mold 460. In this case, the optical stack 720d does not extend to the edges of the first curved mold surface 462. The optical assembly resulting from injection molding a lens onto to optical stack 720d may be as described for optical assembly 600, for example.

Figure 7E:
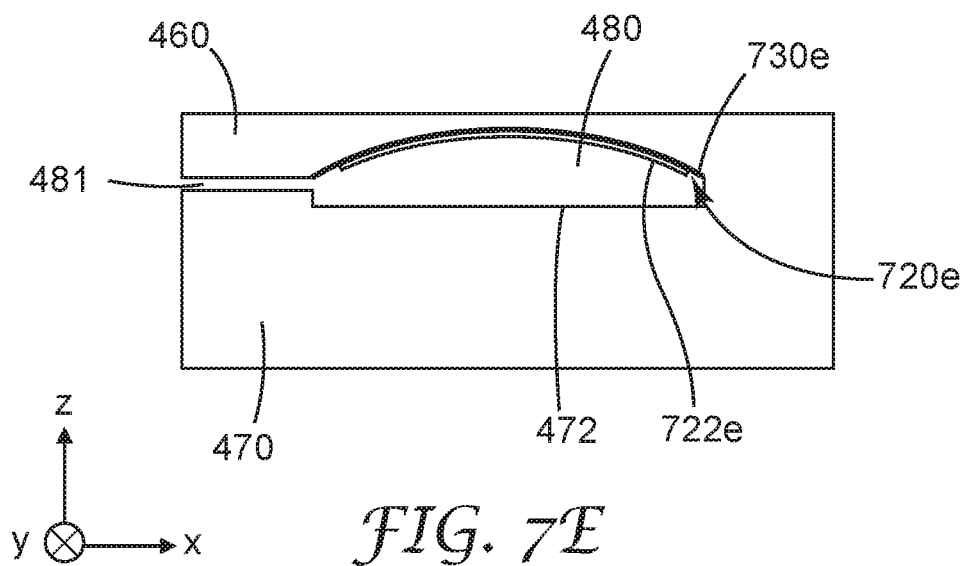

FIG. 7E is a schematic cross-sectional view of an alternative optical stack 720e disposed on the first curved mold surface 462 of the first mold 460. In this case, the optical stack 720e includes an optical film 722e that does not extend to the edges of the first curved mold surface 462 and an additional layer 730e (e.g., a liner releasable attached to the optical film 722e). The optical assembly resulting from injection molding a lens onto to optical stack 720e may be as described for optical assembly 500, for example.

The insert molding process can be repeated using a first optical element injection molded onto an optical film as an insert for a second insert molding process that forms a second optical element on the optical film opposite the first optical element.

Figure 8A:
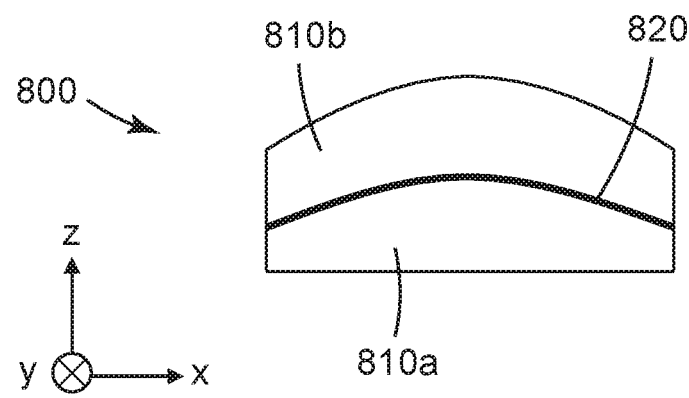
FIGS. 8A-8C are schematic cross-sectional views of optical assemblies.

FIG. 8A is a schematic cross-sectional view of an optical assembly 800 including an optical stack or optical film 820;

a first optical element 810*a*, which may be injection insert molded directly onto the optical film 820; and a second optical element 810*b* disposed on the optical film 820 opposite the first optical element 810*a*. The second optical element 810*b* may be injection insert molded directly onto the optical film 820 opposite the first optical element 810*a*. In some embodiments, the first and second optical elements 810*a* and 810*b* are first and second lenses. In some embodiments, each location on each of the first and second lenses has an optical retardance of no more than about 10 nm.

Figure 8B:
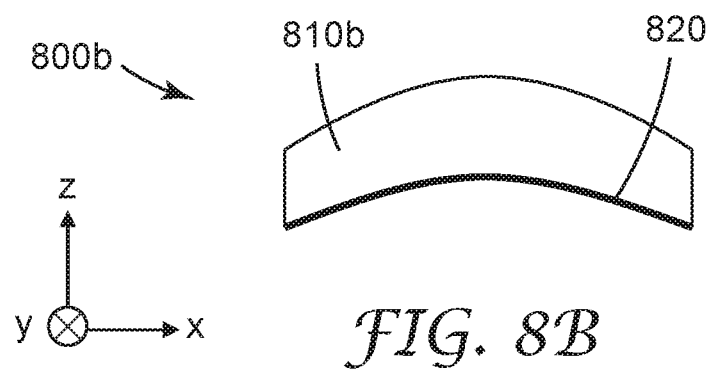

In some embodiments, a lens having the shape of second optical element 810*b* is molded onto optical film 820 without including first optical element 810*a*. FIG. 8B is a schematic cross-sectional view of optical assembly 800*b* including optical film 820 and the optical element 810*b*, which may be injection insert molded directly onto the optical film 820.

Figure 8C:
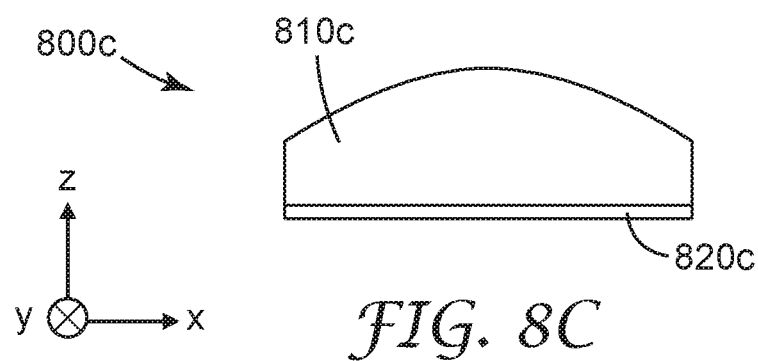

Another embodiment is illustrated in FIG. 8C which is a schematic cross-section view of optical assembly 800*c* including an optical stack or optical film 820*c* and an optical element 810*c* insert molded onto the optical stack or optical film 820*c*. In this case, the optical stack or optical film 820*c* is disposed on a substantially planar surface of the optical element 810*c*.

Figure 9:
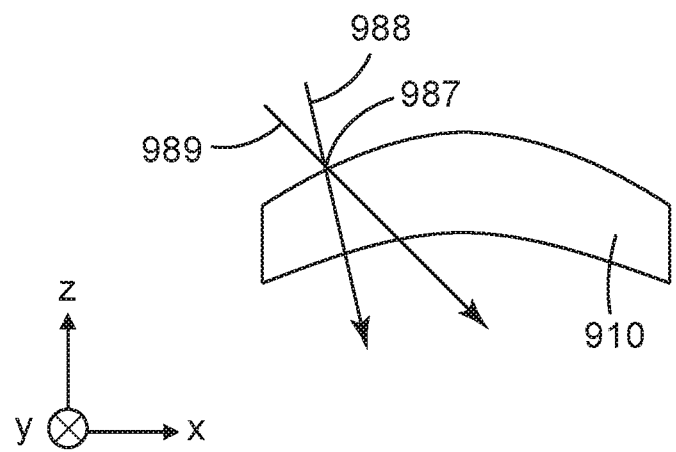
FIG. 9 is a schematic cross-sectional view of an optical element.

The optical retardance at a location on an optical element, such as a lens, is the phase retardance of light transmitted through the optical element that passes through the location and that has a shortest path through the optical element. For example, FIG. 9 schematically illustrates two light rays 988 and 989 incident on optical element 910 at location 987 and transmitted though optical element 910. The optical retardance is specified with respect to light ray 989 since this has the shortest path through the optical element 910 for light rays passing through location 987. When the opposing major surfaces of the optical element 910 are about parallel, approximately normally incident light has the shortest path through the optical element. When the opposing major surfaces are not parallel, the shortest path may be for non-normally incident light. The phase retardance is the maximum difference in phase for two orthogonally polarized light rays through the location. The wavelength of the incident light ray is about 550 nm unless specified differently. The optical retardance of an optical element may be characterized by the locations on a major surface of the optical element. In some embodiments, an optical element, such as a lens, has a low optical retardance. In some embodiments, the optical retardance is no more than about 10 nm at each location over at least 80%, or at least 90% of a major surface (by surface area) of the optical element. In some embodiments, the optical retardance at each location on the optical element is no more than about 10 nm, or no more than about 7 nm. In some embodiments, the optical element is a lens having an optical retardance at the center of the lens of no more than about 5 nm.

In some embodiments, the optical retardance is low (e.g., in any of the above ranges) even when the lens has a substantial thickness variation. For example, in some embodiments a lens has an optical retardance of no more than about 10 nm at each location over at least 80% of a major surface of the lens, and has a lens thickness at a first lens location at least about 20% greater, or at about least 30% greater, or at least about 40% greater, or at least about 50% greater, or at least about 75% greater, or at least about 100% greater, or at least about 150% greater, or at least about 200% greater than a lens thickness at a second lens location.

The optical retardance of an optical element can be made low (e.g., less than 10 nm) by using a low retardance material as the flowable material 483 in making the optical element and/or by maintaining the flowable material 483 at an elevated temperature after filling the mold cavity 480 with the flowable material 483 for long enough that the birefringence substantially relaxes out. Suitable materials that can be used for flowable material 483 include polymethylmethacrylate (PMMA), polycarbonate, polystyrene, cyclic olefin, and polyethylene terephthalate (PET). A suitable PMMA which provides low birefringence is Optimas 7500 available form Mitsubishi Gas Chemical Company, Inc., for example. It has been found that optical films having a plurality of alternating polymeric layers can still provide a high reflectivity for at least one polarization state when the lens or optical element has a melting point higher than a glass transition temperature of the optical film, but less than a melting temperature of the optical films, even when the optical element is allowed to relax to a low birefringence.

Even when the birefringence is allowed to relax to a lower value, there still may be a residual birefringence and optical retardance, though the optical retardance may be low (e.g., no more than 10 nm). In some embodiments, the optical retardance exhibits some spatial variation through the optical element while remaining no more than about 10 nm. In some embodiments, an optical retardance of the optical element, which may be a lens, at at least one location closer to an edge of the optical element is greater than an optical retardance of the optical element at at least one location closer to a center of the optical element.

Figure 10:
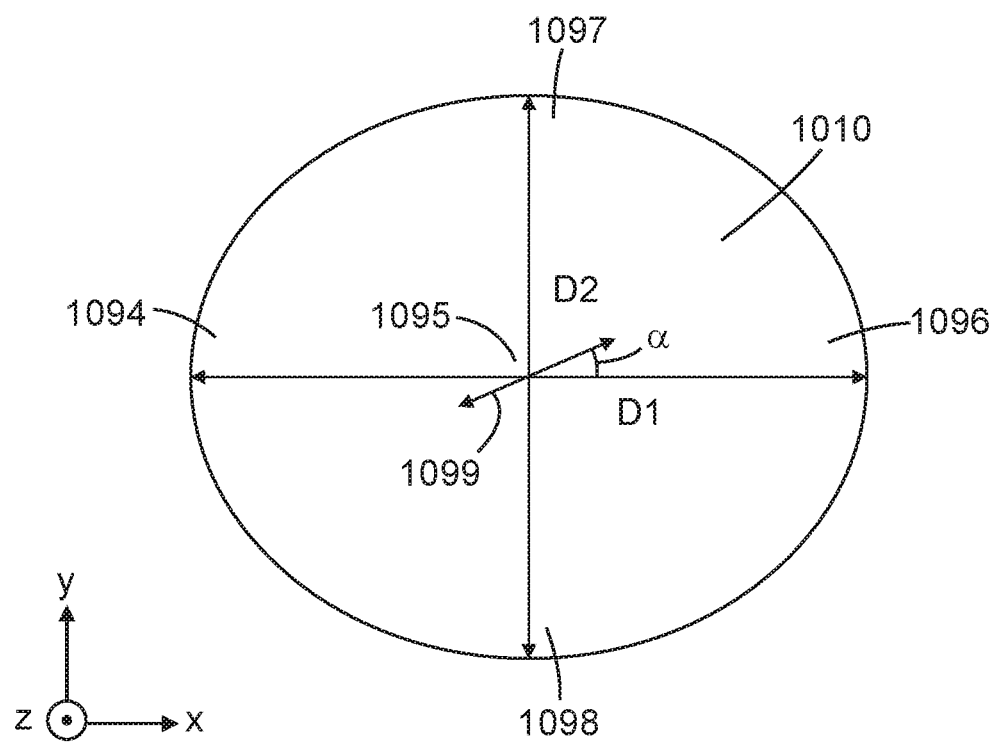
FIG. 10 is a schematic top plan view of a lens.

FIG. 10 is a schematic top plan view of a lens 1010 which has a largest lateral dimension along a first direction (parallel to x-direction) of D1 and has a largest lateral dimension along an orthogonal second direction (parallel to y-direction) of D2. D1 may be larger than, smaller than, or about the same as D2. In some embodiments, the lens 1010 has an optical retardance that varies more along the largest lateral dimension in the first direction D1, that varies less along the largest lateral dimension in the orthogonal second direction D2, and that is no more than about 10 nm at each location on the lens 1010. In some cases, the variation in optical retardance is due to the injection insert molding process used to make the lens 1010 with the optical retardance being higher near the gate and lower elsewhere. For example, first edge location 1094 may be an edge location near the gate and may have a higher optical retardance than center location 1095. In some embodiments, first edge location 1094 has an optical retardance higher than that at center location 1095 and higher than that at second edge location 1096. In some embodiments, third edge location 1097 and fourth edge location 1098 have an optical retardance within R1 of the optical retardance at the center location 1095 and first edge location 1094 has an optical retardance greater than R2 plus the optical retardance at the center location 1095 where R2>R1. For example, R2 may be 2.5 nm, R1 may be 1.5 nm, the optical retardance at the center location 1095 may be 4 nm, the optical retardance at each of the second, third, and fourth edge locations 1096, 1097, and 1098 may be each about 5 nm and the optical retardance at the first edge location 1094 may be about 7 nm. In some embodiments, the highest optical retardance occurs at the first edge location 1094 (near the gate) and the lowest optical retardance occurs at the center location 1095.

Edge and center locations refer to locations closer to an edge or to a center, respectively, of the lens 1010. The center of the lens 1010 may refer to the center in plan view where the first and second directions cross. In some embodiments, a center location is within 10% of the smaller of D1 and D2 of a center of the lens 10 and an edge location is within 10% of the smaller of D1 and D2 of an edge of the lens 10.

In some embodiments, the lens 1010 is molded onto an optical film or an optical stack including an optical film where the optical film is a reflective polarizer, each location on the reflective polarizer substantially reflecting normally incident light having the predetermined wavelength and a block polarization state and substantially transmitting normally incident light having the predetermined wavelength and an orthogonal pass polarization state. In some embodiments, the first direction is substantially parallel to the block polarization state at a center of the reflective polarizer. In some embodiments, the first direction is substantially parallel to the pass polarization state at a center of the reflective polarizer. In some embodiments, the first direction is at an oblique angle to the block polarization state at a center of the reflective polarizer. For example, the block axis of the reflective polarizer at the center of the reflective polarizer may be along the axis 1099 making an angle α with the first direction along D1. In some embodiments, the angle α is less than 10 degrees.

Terms such as "about" or "substantially" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

The following is a list of exemplary embodiments of the present description.

Embodiment 1 is an optical assembly, comprising an optical element insert molded directly onto an optical stack, the optical stack comprising an optical film and a liner, the optical film being disposed between the optical element and the liner, wherein the liner is removable from the optical film without substantial damage to the optical film.

Embodiment 2 is the optical assembly of Embodiment 1, wherein each location over at least about 80% of a total area of the optical film has a reflectance greater than about 80% for normally incident light having a same predetermined wavelength and a same first polarization state.

Embodiment 3 is the optical assembly of Embodiment 2, wherein each location over at least about 80% of a total area of the optical film has a reflectance greater than about 80% for normally incident light having the predetermined wavelength and a same second polarization state orthogonal to the first polarization state.

Embodiment 4 is the optical assembly of Embodiment 2, wherein each location over at least about 80% of a total area of the optical film has a transmittance greater than about 80% for normally incident light having the predetermined wavelength and a same second polarization state orthogonal to the first polarization state.

Embodiment 5 is the optical assembly of Embodiment 2, wherein each location over at least about 80% of a total area of the optical film has a transmittance less than about 5% for normally incident light having the predetermined wavelength and the first polarization state.

Embodiment 6 is the optical assembly of any one of Embodiment 1 to 5, wherein the optical film comprises a plurality of alternating polymeric layers reflecting or transmitting light primarily by optical interference.

Embodiment 7 is the optical assembly of Embodiment 1, wherein the optical element is injection insert molded directly onto the optical stack.

Embodiment 8 is the optical assembly of Embodiment 7, wherein a melting temperature of the optical element is substantially larger than a glass transition temperature of the optical film.

Embodiment 9 is the optical assembly of Embodiment 7, wherein a melting temperature of optical element is about same as a melting temperature of the optical film.

Embodiment 10 is the optical assembly of Embodiment 1, wherein the liner has a glass transition temperature greater than about 50° C.

Embodiment 11 is the optical assembly of Embodiment 1, wherein the liner completely covers the optical film and extends beyond a perimeter of the optical film.

Embodiment 12 is the optical assembly of any one of Embodiments 1 to 11, wherein the optical element is a lens.

Embodiment 13 is the optical assembly of any one of Embodiments 1 to 12, wherein the optical element has an optical retardance of no more than about 10 nm at each location on the optical element.

Embodiment 14 is the optical assembly any one of Embodiments 1 to 13, wherein an optical retardance of the optical element at at least one location closer to an edge of the optical element is greater than an optical retardance of the optical element at at least one location closer to a center of the optical element.

Embodiment 15 is the optical assembly of Embodiment 1, wherein an interface between a first major surface of the liner and an outermost major surface of the optical film is optically smooth.

Embodiment 16 is the optical assembly of Embodiment 1, wherein an interface between a first major surface of the liner and an outermost major surface of the optical film is textured.

Embodiment 17 is the optical assembly of Embodiment 1, wherein a protective coating is disposed on the optical film between the optical film and the liner.

Embodiment 18 is the optical assembly of Embodiment 1, wherein the optical film comprises a plurality of interference layers and an outermost noninterference layer.

Embodiment 19 is the optical assembly of Embodiment 18, wherein the outermost noninterference layer comprises a protective coating.

Embodiment 20 is the optical assembly of Embodiment 17 or 19, wherein the protective coating is a hardcoat.

Embodiment 21 is the optical assembly of Embodiment 17, 19, or 20, wherein the protective coating comprises an at least partially cured composition comprising:
  a) 70 to 90 weight percent of a urethane (meth)acrylate compound having an average (meth)acrylate functionality of 3 to 9, based on the total weight of components a) to d);
  b) 5 to 20 weight percent of a (meth)acrylate monomer having a (meth)acrylate functionality of 1 to 2, based on the total weight of components a) to d), wherein the (meth)acrylate monomer is not a urethane (meth)acrylate compound;
  c) 0.5 to 2 weight percent of silicone (meth)acrylate, based on the total weight of components a) to d); and
  d) optional effective amount of photoinitiator.

Embodiment 22 is the optical assembly of Embodiment 1, wherein the optical element at least partially wraps around an edge of the optical stack.

Embodiment 23 is the optical assembly of Embodiment 1, wherein the optical element at least partially wraps around an edge of the optical film to be substantially flush with the optical film.

Embodiment 24 is an optical assembly, comprising:
an integrally formed multilayer optical film; and
a first optical element injection insert molded directly onto the optical film, the optical film comprising a plurality of alternating polymeric layers reflecting or transmitting light primarily by optical interference, each location over at least 80% of a total area of the optical film having a reflectance greater than about 80% for normally incident light having a same predetermined wavelength and a same first polarization state,
wherein a melting temperature of the first optical element is substantially larger than a glass transition temperature of the optical film.

Embodiment 25 is the optical assembly of Embodiment 24, wherein the melting temperature of the first optical element is at least about 50° C. larger than the glass transition temperature of the optical film.

Embodiment 26 is the optical assembly of Embodiment 24 being integrally formed.

Embodiment 27 is the optical assembly of Embodiment 24, wherein an outermost layer of the optical film is diffusion bonded to a major surface of the first optical element.

Embodiment 28 is the optical assembly of Embodiment 27, wherein the bonding of the optical film to the optical element is stronger than an interlayer bonding between at least one pair of immediately adjacent layers in the optical film.

Embodiment 29 is the optical assembly of Embodiment 24, wherein the first optical element is a lens.

Embodiment 30 is the optical assembly of Embodiment 24, wherein an absolute value of a difference between the melting temperature of the first optical element and a melting temperature of the optical film is less than 50° C.

Embodiment 31 is the optical assembly of Embodiment 24, wherein the first optical element has an optical retardance varying more along a largest lateral dimension in a first direction and varying less along a largest lateral dimension in an orthogonal second direction.

Embodiment 32 is the optical assembly of Embodiment 31, wherein the optical film is a reflective polarizer, each location on the reflective polarizer substantially reflecting normally incident light having the predetermined wavelength and a block polarization state and substantially transmitting normally incident light having the predetermined wavelength and an orthogonal pass polarization state, the first direction being substantially parallel to the block polarization state at a center of the reflective polarizer.

Embodiment 33 is an optical assembly, comprising:
an integrally formed multilayer optical film, the optical film comprising a plurality of alternating polymeric layers reflecting or transmitting light primarily by optical interference; and
an optical element insert molded directly onto the optical film, the optical film being diffusion bonded to the optical element,
wherein the bonding of the optical film to the optical element is stronger than an interlayer bonding between at least one pair of immediately adjacent layers in the optical film.

Embodiment 34 is the optical assembly of Embodiment 33, wherein each location on the optical film has a reflectance greater than about 80% for normally incident light having a same predetermined wavelength and a same first polarization state.

Embodiment 35 is the optical assembly of Embodiment 34, wherein each location on the optical film has a reflectance greater than about 80% for normally incident light having the predetermined wavelength and a same second polarization state orthogonal to the first polarization state.

Embodiment 36 is the optical assembly of Embodiment 34, wherein each location on the optical film has a transmittance greater than about 80% for normally incident light having the predetermined wavelength and a same second polarization state orthogonal to the first polarization state.

Embodiment 37 is the optical assembly of Embodiment 33, wherein the optical element is injection insert molded directly onto the optical film and a melting temperature of the first optical element is at least about 50° C. larger than a glass transition temperature of the optical film.

Embodiment 38 is an optical assembly, comprising:
an integrally formed multilayer optical film, the optical film comprising a plurality of alternating polymeric layers reflecting or transmitting light primarily by optical interference, each location over at least 90% of a total area of the optical film having a reflectance greater than about 90% for normally incident light having a same predetermined wavelength and a same first polarization state; and
an optical element insert molded directly onto the optical film, the optical film being diffusion bonded to the optical element.

Embodiment 39 is the optical assembly of Embodiment 38, wherein a melting temperature of the optical element is substantially larger than a glass transition temperature of the optical film.

Embodiment 40 is the optical assembly of Embodiment 38, wherein a melting temperature of the optical element is at least about 50° C. larger than a glass transition temperature of the optical film.

Embodiment 41 is the optical assembly of Embodiment 38, wherein an absolute value of a difference between a melting temperature of the first optical element and a melting temperature of the optical film is less than about 50° C.

Embodiment 42 is the optical assembly of Embodiment 38, wherein the bonding of the optical film to the optical element is stronger than an interlayer bonding between at least one pair of immediately adjacent layers in the optical film.

Embodiment 43 is the optical assembly of Embodiment 38, wherein the optical film is a reflective polarizer, each location on the reflective polarizer substantially reflecting normally incident light having the predetermined wavelength and a block polarization state and substantially transmitting normally incident light having the predetermined wavelength and an orthogonal pass polarization state, the first polarization state being the block polarization state at a center of the reflective polarizer.

Embodiment 44 is the optical assembly of Embodiment 43, wherein each location on the optical film has a transmittance less than about 1% for normally incident light having the predetermined wavelength and the block polarization state.

Embodiment 45 is an optical assembly, comprising:
an optical film comprising a plurality of alternating polymeric layers reflecting or transmitting light primarily by optical interference, each location over at least 90% of a total area of the optical film having a reflectance greater than 90% for normally incident light having a same predetermined wavelength and a same first polarization state; and
a lens insert molded directly onto the optical film, the lens having an optical retardance varying more along a largest lateral dimension in a first direction and varying less along a largest lateral dimension in an orthogonal second direction, the optical retardance at each location on the lens being no more than about 10 nm.

Embodiment 46 is the optical assembly of Embodiment 45, wherein the optical film is a reflective polarizer, each location on the reflective polarizer substantially reflecting normally incident light having the predetermined wavelength and a block polarization state and substantially transmitting normally incident light having the predetermined wavelength and an orthogonal pass polarization state.

Embodiment 47 is the optical assembly of Embodiment 45, wherein each location on the optical film has a transmittance less than about 5% for normally incident light having the predetermined wavelength and the first polarization state.

Embodiment 48 is the optical assembly of Embodiment 45, wherein the lens at least partially wraps around an edge of the optical film to be substantially flush with the optical film.

Embodiment 49 is the optical assembly of Embodiment 45, wherein the optical film is diffusion bonded to the lens such that the bonding of the optical film to the lens is stronger than an interlayer bonding between at least one pair of immediately adjacent layers in the optical film.

Embodiment 50 is an optical assembly, comprising:
a lens; and
a multilayer optical film having opposing first and second major surfaces, the first major surface disposed on a first portion of a first side of the lens, each location over at least 80% of a total area of the multilayer optical film having a reflectance greater than about 80% for normally incident light having a same predetermined wavelength and a same first polarization state,
wherein a second portion of the first side of the lens is substantially flush with the second major surface of the multilayer optical film.

Embodiment 51 is the optical assembly of Embodiment 50, wherein the lens is injection molded directly onto the multilayer optical film.

Embodiment 52 is the optical assembly of Embodiment 50, wherein the lens is injection molded directly onto an optical stack comprising the multilayer optical film.

Embodiment 53 is the optical assembly of Embodiment 52, wherein the optical stack further comprises a first layer not integral with the multilayer optical film, the multilayer optical film disposed between the lens and the first layer.

Embodiment 54 is the optical assembly of Embodiment 53, wherein the first layer extends across the optical film and the second portion of the first side of the lens.

Embodiment 55 is the optical assembly of Embodiment 53 or 54, wherein the first layer is a protective layer.

Embodiment 56 is the optical assembly of Embodiment 55, wherein the protective layer comprises an at least partially cured composition comprising:
a) 70 to 90 weight percent of a urethane (meth)acrylate compound having an average (meth)acrylate functionality of 3 to 9, based on the total weight of components a) to d);
b) 5 to 20 weight percent of a (meth)acrylate monomer having a (meth)acrylate functionality of 1 to 2, based on the total weight of components a) to d), wherein the (meth)acrylate monomer is not a urethane (meth)acrylate compound;
c) 0.5 to 2 weight percent of silicone (meth)acrylate, based on the total weight of components a) to d); and
d) optional effective amount of photoinitiator.

Embodiment 57 is the optical assembly of Embodiment 53 or 54, wherein the first layer is a liner releasably attached to the multilayer optical film.

Embodiment 58 is the optical assembly of Embodiment 50, wherein the second portion of the first side of the lens substantially surrounds a perimeter of the first portion of the first side of the lens.

Embodiment 59 is the optical assembly of Embodiment 50, wherein the optical film is diffusion bonded to the lens such that the bonding of the optical film to the lens is stronger than an interlayer bonding between at least one pair of immediately adjacent layers in the optical film.

Embodiment 60 is an optical assembly, comprising:
a lens; and
an optical stack disposed on a major surface of the lens, wherein the lens at least partially wraps around an edge of the optical stack.

Embodiment 61 is the optical assembly of Embodiment 60, wherein the optical stack comprises a multilayer optical film comprising a plurality of alternating polymeric layers reflecting or transmitting light primarily by optical interference.

Embodiment 62 is the optical assembly of Embodiment 61, wherein the lens at least partially wraps around an edge of the multilayer optical film.

Embodiment 63 is the optical assembly of Embodiment 62, wherein the lens at least partially wraps around an edge of the multilayer optical film to be flush with the multilayer optical film.

Embodiment 64 is the optical assembly of Embodiment 61, wherein the optical stack further comprises an additional film not integral with the multilayer optical film.

Embodiment 65 is the optical assembly of Embodiment 64, wherein the multilayer optical film is disposed between the additional film and the lens.

Embodiment 66 is the optical assembly of Embodiment 64 or 65, wherein the lens does not wrap around an edge of the additional film.

Embodiment 67 is the optical assembly of Embodiment 64 or 65, wherein the lens at least partially wraps around an edge of the additional film.

Embodiment 68 is the optical assembly of Embodiment 64 or 65, wherein the lens at least partially wraps around an edge of the additional film to be flush with the additional film.

Embodiment 69 is an optical assembly comprising:
a lens having a first major surface defining a curved recess therein; and
a multilayer optical film adhered and conforming to the curved recess.

Embodiment 70 is the optical assembly of Embodiment 69, wherein the multilayer optical film comprises opposing outermost first and second major surfaces, the first major surface of the multilayer optical film being adhered to the curved recess, a portion of the first major surface of the lens being flush with the second major surface of the multilayer optical film.

Embodiment 71 is the optical assembly of Embodiment 69, wherein the multilayer optical film comprises opposing outermost first and second major surfaces, the first major surface of the multilayer optical film being adhered to the curved recess, a portion of the first major surface of the lens wrapping around an edge of the multilayer optical film and extending past the second major surface of the multilayer optical film in a direction parallel to a normal to the lens at a center of the first major surface of the lens.

Embodiment 72 is the optical assembly of Embodiment 71 further comprising an additional layer disposed on the multilayer optical film opposite the lens, the additional layer not integral with the multilayer optical film, the portion of the first major surface of the lens being flush with an outermost major surface of the additional layer opposite the multilayer optical film.

Embodiment 73 is the optical assembly of Embodiment 69, wherein the optical film is diffusion bonded to the lens such that the bonding of the optical film to the lens is stronger than an interlayer bonding between at least one pair of immediately adjacent layers in the optical film.

Embodiment 74 is the optical assembly of Embodiment 69, wherein each location over at least 80% of a total area of the multilayer optical film has a reflectance greater than about 80% for normally incident light having a same predetermined wavelength and a same first polarization state.

Embodiment 75 is an optical assembly, comprising:
an optical film, each location over at least 80% of a total area of the optical film having a reflectance greater than about 80% for normally incident light having a same predetermined wavelength and a same first polarization state; and
a lens injection molded directly onto the optical film, the lens having an optical retardance of no more than about 10 nm at each location over at least 80% of a major surface of the lens, a lens thickness at a first lens location being at least about 20% greater than a lens thickness at a second lens location.

Embodiment 76 is the optical assembly of Embodiment 75, wherein the optical film comprises a plurality of alternating polymeric layers, the optical film being diffusion bonded to the lens such that the bonding of the optical film to the lens is stronger than an interlayer bonding between at least one pair of immediately adjacent layers in the plurality of alternating polymeric layers.

EXAMPLES

Example 1: Insert Molding of a Lens onto APF

A multilayer optical film reflective polarizer (Advanced Polarizing film (APF) available from 3M Company, St. Paul, Minn.) was thermoformed into an 8 Base lens shape as generally described in U.S. Pat. No. 9,557,568 (Ouderkirk et al.).

Optical film insert molding was done on a Krauss Maffei 65 ton injection molding machine using an 8 Base lens blank injection molding tool. The thermoformed optical film was trimmed to the correct size to fit in the injection molding tool and was then placed on the convex side of the molding tool. Next the injection molding process was performed using PMMA molding material (Optimas 7500, Mitsubishi Gas Chemical Company, Inc) injected at a temperature of 276° C. into the molding tool cavity at 99° C. The resulting optical assembly was removed from the injection molding machine after a total injection molding cycle time of 66 seconds. Visual inspection of the film before and after the thermoforming and molding process showed no noticeable change in reflectivity.

The bond strength of the film to the lens was tested using a cross hatch tape pull test. This was done by scoring through the insert molded film on the lens surface in a cross hatch pattern, adhering tape over the scored cross hatch film surface, and pulling the tape off the surface. It was found that the multilayer optical film separated with a portion of the optical film being removed with the tape and another portion remaining on the lens. It was concluded that the PMMA molding material bonded strongly to the outer layer of the APF film which was a blend of polycarbonate and copolyesters (PC:coPET). For comparison, a cyclic olefin resin was injection molded onto a thermoformed APF in a similar process and the adhesion was tested as described above. It was found that the APF was entirely removed with the tape leaving no optical film on the lens.

To determine the retardance of a lens made by injection molding, a lens was formed as described above without the optical film and the retardance was measured using an Axometrics AxoScan™ Muller matrix polarimeter (available from Axometrics, Inc., Huntsville, Ala.). The lens had an approximately constant thickness of about 2 mm, a radius of curvature of 36 mm and a diameter of 70 mm. The retardance in nm as a function of polar and azimuthal angles (using spherical coordinates with polar angle measured from the apex of the lens) is show in Table 1. A wavelength of 550 nm was used and the results were averaged over 20 scans. Duplicate points were measured to determine the repeatability of the results (e.g., a polar angle of 48 degrees and an azimuthal angle of 0 degrees is equivalent to a polar angle of minus 48 degrees and an azimuthal angle of 180 degrees. The retardance varied more in a direction from the gate side (polar angle about −48 degrees and azimuth angle of about 0 degrees) to the opposite side of the lens and varied less in an orthogonal direction. The retardance was higher than 10 nm in a small region near the gate and was less than 10 nm over at least 80% of the lens. It is believed that a longer annealing time would reduce the retardance near the gate so that the retardance would be less than 10 nm throughout the lens.

TABLE 1

| Azimuthal Angle (deg) | Retardance (nm) Polar Angle (deg) | | | | | | | | |
|---|---|---|---|---|---|---|---|---|---|
| | −48 | −36 | −24 | −12 | 0 | 12 | 24 | 36 | 48 |
| 0 | 30 | 6.4 | 2 | 1.7 | 1.4 | 1 | 0.66 | 1 | 5.8 |
| 30 | 17 | 4.2 | 2.3 | 1.7 | 1.4 | 1 | 0.9 | 0.9 | 4.3 |
| 60 | 9.3 | 2.3 | 2.4 | 1.7 | 1.3 | 1.3 | 1.5 | 1.2 | 3.5 |
| 90 | 5.5 | 1.4 | 2.2 | 1.6 | 1.4 | 1.5 | 2 | 1.5 | 4.97 |
| 120 | 3.4 | 1.3 | 1.7 | 1.3 | 1.4 | 1.6 | 2.2 | 2.1 | 8.3 |
| 150 | 4.2 | 1.2 | 1 | 1.1 | 1.3 | 1.7 | 2.1 | 3.5 | 14.7 |
| 180 | 5.6 | 1.3 | 0.7 | 1 | 1.4 | 1.6 | 1.9 | 5.3 | 28.4 |

Example 2: Insert Molding of a Lens onto Optical Stack of APF and Liner

An optical stack was thermoformed into an 8 Base lens shape as generally described in U.S. Pat. No. 9,557,568 (Ouderkirk et al.). The optical stack was a multilayer optical film reflective polarizer (APF) with a protective film liner (OCPET NSA33T, Sun A Kaken Co, Ltd) disposed on each major surface of the APF. The liners were aligned with the APF and did not extend past the edges of the APF.

Optical stack insert molding was done on a Krauss Maffei 65 ton injection molding machine using an 8 Base lens blank injection molding tool. The thermoformed optical stack was trimmed to the correct size to fit in the injection molding tool and one of the liners were removed. The thermoformed optical stack and was then placed on the convex side of the molding tool with the remaining liner facing away from the mold cavity. Next the injection molding process was performed using PMMA molding material (Optimas 7500, Mitsubishi Gas Chemical Company, Inc) injected at a temperature of 268° C. into the molding tool cavity at 82° C. The resulting optical assembly was removed from the injection molding machine after a total injection molding cycle time of 66 seconds.

The bond strength of the film to the lens was tested as in Example 1. It was found that the multilayer optical film separated with a portion of the optical film being removed with the tape and another portion remaining on the lens.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

All references, patents, and patent applications referenced in the foregoing are herein incorporated by reference in their entirety in a consistent manner. In the event of inconsistencies or contradictions between portions of the incorporated references and this application, the information in the preceding description shall control.

What is claimed is:

1. An optical assembly, comprising an optical element insert molded directly onto an optical stack, the optical stack comprising an integrally formed optical film and at least one additional layer not integral with the optical film, the optical film being disposed between the optical element and the at least one additional layer, the optical film comprising a plurality of alternating polymeric layers reflecting or transmitting light primarily by optical interference, a bonding of the optical film to the optical element being stronger than an interlayer bonding between at least one pair of immediately adjacent layers in the optical film, the optical film being diffusion bonded to the optical element.

2. The optical assembly of claim 1, wherein the optical element is injection insert molded directly onto the optical stack.

3. The optical assembly of claim 2, wherein a melting temperature of the optical element is substantially larger than a glass transition temperature of the optical film.

4. The optical assembly of claim 2, wherein a melting temperature of the optical element and a melting temperature of the optical film differ by less than 10° C.

5. The optical assembly of claim 1, wherein each location over at least about 80% of a total area of the optical film has a reflectance greater than about 80% for normally incident light having a same predetermined wavelength and a same first polarization state.

6. The optical assembly of claim 5, wherein each location over at least about 80% of the total area of the optical film has a reflectance greater than about 80% for normally incident light having the predetermined wavelength and a same second polarization state orthogonal to the first polarization state.

7. The optical assembly of claim 5, wherein each location over at least about 80% of the total area of the optical film has a transmittance greater than about 80% for normally incident light having the predetermined wavelength and a same second polarization state orthogonal to the first polarization state.

8. The optical assembly of claim 1, wherein the at least one additional layer comprises a liner and a protective coating disposed on the optical film between the optical film and the liner, wherein the protective coating comprises an at least partially cured composition comprising:
   a) 70 to 90 weight percent of a urethane (meth)acrylate compound having an average (meth)acrylate functionality of 3 to 9, based on the total weight of components a) to d);
   b) 5 to 20 weight percent of a (meth)acrylate monomer having a (meth)acrylate functionality of 1 to 2, based on the total weight of components a) to d), wherein the (meth)acrylate monomer is not a urethane (meth)acrylate compound;
   c) 0.5 to 2 weight percent of silicone (meth)acrylate, based on the total weight of components a) to d); and
   d) optional effective amount of photoinitiator.

9. The optical assembly of claim 1, wherein the optical element at least partially wraps around an edge of the optical film to be substantially flush with the optical film.

10. The optical assembly of claim 1, wherein the optical element is a lens having an optical retardance of no more than about 10 nm at each location over at least 80% of a major surface of the lens.

11. The optical assembly of claim 1, wherein the at least one additional layer comprises a liner releasably bonded to the optical film such that for each location over at least 80% of a total area of the optical film:
   the optical film has a reflectance greater than about 80% for normally incident light having a same predetermined wavelength and a same first polarization state; and
   a difference between the reflectance of the optical film at the location before and after the liner is removed is less than about 5%.

12. An optical assembly, comprising:
   an integrally formed multilayer optical film, the optical film comprising a plurality of alternating polymeric layers reflecting or transmitting light primarily by optical interference; and
   an optical element insert molded directly onto the optical film, the optical film being diffusion bonded to the optical element,
   wherein the bonding of the optical film to the optical element is stronger than an interlayer bonding between at least one pair of immediately adjacent layers in the optical film.

13. The optical assembly of claim 12, wherein the optical element is injection insert molded directly onto the optical film and a melting temperature of the optical element is at least about 50° C. larger than a glass transition temperature of the optical film.

14. The optical assembly of claim 12, wherein each location on the optical film has a reflectance greater than about 80% for normally incident light having a same predetermined wavelength and a same first polarization state.

15. The optical assembly of claim 14, wherein each location on the optical film has a reflectance greater than about 80% for normally incident light having the predetermined wavelength and a same second polarization state orthogonal to the first polarization state.

16. The optical assembly of claim 14, wherein each location on the optical film has a transmittance greater than about 80% for normally incident light having the predetermined wavelength and a same second polarization state orthogonal to the first polarization state.

17. An optical assembly, comprising:
an integrally formed multilayer optical film, the optical film comprising a plurality of alternating polymeric layers reflecting or transmitting light primarily by optical interference, each location over at least 90% of a total area of the optical film having a reflectance greater than about 90% for normally incident light having a same predetermined wavelength and a same first polarization state; and
an optical element insert molded directly onto the optical film, the optical film being diffusion bonded to the optical element.

18. The optical assembly of claim 17, wherein a melting temperature of the optical element is at least about 50° C. larger than a glass transition temperature of the optical film.

19. The optical assembly of claim 17, wherein the bonding of the optical film to the optical element is stronger than an interlayer bonding between at least one pair of immediately adjacent layers in the optical film.

20. The optical assembly of claim 17, wherein the optical film is a reflective polarizer, each location on the reflective polarizer substantially reflecting normally incident light having the predetermined wavelength and a block polarization state and substantially transmitting normally incident light having the predetermined wavelength and an orthogonal pass polarization state, the first polarization state being the block polarization state at a center of the reflective polarizer.

21. The optical assembly of claim 20, wherein each location on the optical film has a transmittance less than about 1% for normally incident light having the predetermined wavelength and the block polarization state.

* * * * *